(12) United States Patent
Lin et al.

(10) Patent No.: US 12,487,963 B2
(45) Date of Patent: Dec. 2, 2025

(54) DATA TRANSMISSION METHOD, CHIP, AND DEVICE

(71) Applicant: HUAWEI TECHNOLOGIES CO., LTD., Shenzhen (CN)

(72) Inventors: Weibin Lin, Hangzhou (CN); Yaoguo Hu, Shenzhen (CN); Shengyu Shen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 18/150,647

(22) Filed: Jan. 5, 2023

(65) Prior Publication Data

US 2023/0153264 A1   May 18, 2023

Related U.S. Application Data

(63) Continuation of application No. PCT/CN2021/088771, filed on Apr. 21, 2021.

(30) Foreign Application Priority Data

Jul. 6, 2020 (CN) .......................... 202010639909.7
Jan. 21, 2021 (CN) .......................... 202110080370.0

(51) Int. Cl.
 *G06F 15/173* (2006.01)
 *H04L 67/1097* (2022.01)
(52) U.S. Cl.
 CPC .... *G06F 15/17331* (2013.01); *H04L 67/1097* (2013.01)

(58) Field of Classification Search
 CPC ............. G06F 15/17331; G06F 15/177; G06F 15/1735; H04L 67/1097
 See application file for complete search history.

(56) References Cited

U.S. PATENT DOCUMENTS 6,961,326 B1 * 11/2005 Chang ................... H04W 28/06
 370/252
7,076,569 B1 * 7/2006 Bailey ................... H04L 69/326
 710/39

(Continued)

FOREIGN PATENT DOCUMENTS

CN   113900972 A  *  1/2022  ........... G06F 13/161
CN   110022269 B     12/2022

(Continued)

*Primary Examiner* — Shean Tokuta
(74) *Attorney, Agent, or Firm* — Leydig, Voit & Mayer, Ltd.

(57) ABSTRACT

A data transmission method is provided. The method includes: a network interface card of a source device obtains a first notification message and a second notification message, wherein the first notification message indicates that a first to-be-processed remote direct memory access (RDMA) request exists in a first queue of the source device, the first queue stores a request of a first service application in the source device, the second notification message indicates that a second to-be-processed RDMA request exists in a second queue of the source device, and the second queue stores a request of a second service application in the source device; and the network interface card determines a processing sequence of the first queue and the second queue based on service levels, and sends the first to-be-processed RDMA request and the second to-be-processed RDMA request to a destination device according to the processing sequence.

13 Claims, 13 Drawing Sheets

(56) References Cited

U.S. PATENT DOCUMENTS

| | | | | |
|---|---|---|---|---|
| 7,826,470 | B1* | 11/2010 | Aloni | H04L 49/90 370/463 |
| 7,831,745 | B1* | 11/2010 | Eiriksson | G06F 13/28 710/22 |
| 7,996,583 | B2* | 8/2011 | Wilkinson | H04L 49/90 709/224 |
| 8,014,282 | B2* | 9/2011 | Li | H04L 69/161 370/230.1 |
| 9,037,792 | B1* | 5/2015 | Ingle | G06F 12/0866 711/113 |
| 9,262,243 | B2* | 2/2016 | Archer | G06F 8/453 |
| 9,886,405 | B1* | 2/2018 | Johnson | G06F 13/423 |
| 10,394,751 | B2* | 8/2019 | Pope | G06F 15/17331 |
| 2003/0200315 | A1* | 10/2003 | Goldenberg | H04L 47/43 709/225 |
| 2005/0122904 | A1 | 6/2005 | Kumar | |
| 2005/0198410 | A1* | 9/2005 | Kagan | G06K 13/0825 710/22 |
| 2010/0284274 | A1* | 11/2010 | Ghanadan | H04L 47/22 370/230.1 |
| 2013/0315237 | A1* | 11/2013 | Kagan | H04L 47/2441 370/389 |
| 2014/0012936 | A1* | 1/2014 | Aikoh | G06F 12/084 709/213 |
| 2015/0012607 | A1* | 1/2015 | Cayton | H04L 67/1097 709/212 |
| 2015/0026368 | A1* | 1/2015 | Kagan | G06F 13/28 710/22 |
| 2016/0212214 | A1* | 7/2016 | Rahman | H04L 47/6295 |
| 2016/0342547 | A1* | 11/2016 | Liss | G06F 13/4282 |
| 2017/0103039 | A1* | 4/2017 | Shamis | H04L 49/103 |
| 2017/0346742 | A1* | 11/2017 | Shahar | H04L 1/1635 |
| 2019/0104029 | A1* | 4/2019 | Guim Bernat | H04L 41/5022 |
| 2019/0342199 | A1* | 11/2019 | Hurson | H04L 47/263 |
| 2019/0372866 | A1* | 12/2019 | Ganguli | H04L 12/4625 |
| 2020/0053018 | A1 | 2/2020 | White et al. | |
| 2020/0314011 | A1* | 10/2020 | Deval | H04L 45/38 |
| 2020/0328192 | A1* | 10/2020 | Zaman | H04L 49/10 |
| 2021/0072927 | A1* | 3/2021 | Yang | G06F 9/5077 |
| 2021/0119835 | A1* | 4/2021 | Levin | H04L 25/03146 |
| 2021/0359955 | A1* | 11/2021 | Musleh | G06F 15/17331 |
| 2021/0409506 | A1* | 12/2021 | Radi | H04L 47/6215 |
| 2022/0191306 | A1* | 6/2022 | Radi | H04L 69/163 |
| 2022/0197539 | A1* | 6/2022 | Gong | G06F 3/0655 |
| 2023/0153264 | A1* | 5/2023 | Lin | G06F 3/061 |
| 2025/0110814 | A1* | 4/2025 | Klacar | G06F 9/4812 |

FOREIGN PATENT DOCUMENTS

| | | | | |
|---|---|---|---|---|
| EP | 3547628 | A1 * | 10/2019 | H04L 49/3036 |
| EP | 4160425 | A1 * | 4/2023 | G06F 15/17331 |
| EP | 4160425 | B1 * | 3/2025 | H04L 67/1097 |
| WO | WO-2015078219 | A1 * | 6/2015 | H04L 67/568 |
| WO | WO-2017117259 | A1 * | 7/2017 | H04L 69/22 |
| WO | WO-2022007470 | A1 * | 1/2022 | G06F 15/17331 |

* cited by examiner

DATA TRANSMISSION METHOD, CHIP, AND DEVICE

CROSS-REFERENCE TO RELATED APPLICATIONS

This application is a continuation of International Application No. PCT/CN2021/088771, filed on Apr. 21, 2021, which claims priority to Chinese Patent Application No. 202110080370.0, filed on Jan. 21, 2021, and Chinese Patent Application No. 202010639909.7, filed on Jul. 6, 2020. All of the aforementioned patent applications are hereby incorporated by reference in their entireties.

TECHNICAL FIELD

Embodiments of this application relate to the communication field, and in particular, to a data transmission method, a chip, and a device.

BACKGROUND

With the development of computer technologies, intelligent network interface cards (iNICs) can be used to implement quick data access between devices through the remote direct memory access (RDMA) technology. In the remote direct memory access technology, data is transmitted based on a network transmission queue pair (QP). Correspondingly, a receive device and a transmit device each establish a receive queue (RQ) and a send queue (SQ). Usually, a to-be-processed RDMA request of a service application in a source device is stored in the receive queue, and then a processor notifies a network interface card to obtain the to-be-processed RDMA request, and sends the to-be-processed RDMA request to a destination device. However, how to reduce a processing latency of a to-be-processed request of an important service application becomes an urgent technical problem to be resolved.

SUMMARY

This application provides a data processing method, a chip, and a device, to perceive a service level of a service application, and reduce a processing latency of a to-be-processed request of an important service application.

According to a first aspect, a data transmission method is provided. The method includes: A network interface card of a source device obtains a first notification message, where the first notification message indicates that a first to-be-processed remote direct memory access RDMA request exists in a first queue of the source device, and the first queue is used to store an RDMA request of a first service application of the source device; the network adapter obtains a second notification message, where the second notification message indicates that a second to-be-processed remote direct memory access RDMA request exists in a second queue of the source device, and the second queue is used to store an RDMA request of a second service application of the source device; and the network interface card determines a processing sequence of the first queue and the second queue based on service levels of the first service application and the second service application, and sends the first to-be-processed RDMA request and the second to-be-processed RDMA request to a destination device according to the processing sequence. According to the foregoing method, the network interface card may process, based on different degrees of importance of service applications, RDMA requests associated with the service applications according to a sequence, to meet requirements of service applications at different service levels. In a possible implementation, when processing of the first service application is arranged before processing of the second service application, the network interface card obtains the first to-be-processed RDMA request, and sends the first to-be-processed RDMA request to the destination device. Then the network interface card obtains the second to-be-processed request, and sends the second to-be-processed RDMA request to the destination device. According to the foregoing method, the network interface card may determine a processing sequence of service applications based on service levels, and then transmit a to-be-processed RDMA request according to the processing sequence. In this way, a to-be-processed RDMA request is transmitted based on a service level of a service application. Therefore, the network interface card can percept a service level corresponding to a service, and a processing latency of a to-be-processed RDMA request is controlled based on a requirement of a service level.

In a possible implementation, when processing of the first service application is arranged before processing of the second service application, the network interface card obtains the first to-be-processed RDMA request, and sends the first to-be-processed RDMA request to the destination device. After sending the first to-be-processed request to the destination device, the network interface card obtains the second to-be-processed request, and sends the second to-be-processed request to the destination device. It can be learned from the descriptions of the foregoing process that the network interface card may determine a processing sequence based on service levels of service applications, and then send to-be-processed RDMA requests in a plurality of queues to the destination device according to the determined processing sequence, so that the to-be-processed RDMA requests are sequentially sent based on the service levels of the service applications. It is ensured that a to-be-processed RDMA request of a service application at a high service level is preferentially sent to the destination device. This reduces a processing latency of the to-be-processed RDMA request of the service application at the high service level.

In another possible implementation, the network interface card further includes a storage apparatus. Before the network interface card sends the to-be-processed RDMA request in the first queue to the destination device, the network interface card further determines, according to a specified rule, a storage manner in which a context of the first queue is stored in the storage apparatus. The context of the first queue indicates an identifier of the destination device and an identifier of a queue associated with the first queue in the destination device. Then the network interface card obtains the context of the first queue, and then stores the context of the first queue in the storage apparatus of the network interface card in accordance with the storage manner. According to the foregoing method, the network interface card may store the context of the first queue according to a preset rule, to store the context of the first queue in the storage apparatus of the network interface card in the determined storage manner. In this way, the network interface card can transmit to-be-processed RDMA requests of different service applications according to a processing sequence.

In another possible implementation, the network interface card determines, based on an operation type of the to-be-processed RDMA request in the first queue, the storage manner in which the context of the first queue is stored in the storage apparatus, where the operation type includes a persistent collective operation. According to the descriptions of the foregoing process, the network interface card may determine, based on an operation type of a to-be-processed RDMA request, a storage manner of a context of a queue to which the to-be-processed RDMA request belongs, and further store the context of the queue in accordance with the storage manner. In this way, a latency caused due to frequent access by the network interface card to the memory of the device can be reduced, and a processing latency of transmitting a to-be-processed RDMA request by a service application is further reduced.

In another possible implementation, the network interface card compares a size of a data packet in the to-be-processed RDMA request in the first queue with a first threshold, and determines, based on a comparison result, the storage manner in which the context of the first queue is stored in the storage apparatus. According to the foregoing descriptions, the network interface card can determine a storage manner based on a size of a data packet of a to-be-processed RDMA request. If a data packet is small, a queue context in the memory needs to be frequently obtained in a process in which the network interface card sends data packets. The queue context may be stored in the storage apparatus of the network interface card, to prevent the network interface card from frequently accessing the memory. In this way, a data transmission latency can be reduced.

In another possible implementation, the network interface card compares a usage frequency of the first queue with a second threshold, where the first queue includes a plurality of work queue elements WQEs, each WQE is used to store one to-be-processed RDMA request, and the usage frequency is used to identify a quantity of to-be-processed RDMA requests stored within a first time threshold in the elements of the first queue; and the network interface card determines, based on a comparison result, the storage manner in which the context of the first queue is stored in the storage apparatus. It can be learned from the foregoing descriptions that the network interface card may use different storage manners for queue contexts based on usage frequencies of used queues, and store a context of a frequently used queue in the storage apparatus. This can reduce a processing latency caused due to frequent access by the network interface card to the memory to obtain the queue context, and further reduce a processing latency of a to-be-processed RDMA request.

In another possible implementation, the network interface card determines, based on the service level of the first service application, the storage manner in which the context of the first queue is stored in the storage apparatus. The network interface card may use different storage manners for queue contexts based on service levels of service applications. A queue context corresponding to a service application at a high service level is stored. In this way, processing time of a request of the service application at the high service level is reduced.

In another possible implementation, the first queue and the context of the first queue are stored in the memory of the source device, and that after the network interface card obtains the context of the first queue, the network interface card stores the context of the first queue in the storage apparatus of the network interface card in accordance with the storage manner includes: The network interface card stores the context of the first queue in a first region of the storage apparatus of the network interface card, and retains the context of the first queue in the first storage region within the first time threshold. In other words, the network interface card may divide a storage region in the storage apparatus based on a determined storage manner. The storage region is used to store a queue context within a specified time period. In this way, time for subsequently reading the queue context by the network interface card can be reduced, and RDMA request processing efficiency can be improved.

In another possible implementation, the second queue and a context of the second queue are stored in the memory of the source device, and that after the network interface card obtains the context of the second queue from the memory, the network interface card stores the context of the second queue in the storage apparatus of the network interface card in accordance with the storage manner includes: The network interface card stores the context of the second queue in a second storage region of the storage apparatus of the network interface card, and deletes the context of the second queue from the second storage region after sending of the second to-be-processed RDMA request is completed. It can be learned from the foregoing descriptions that the network interface card may delete, based on a determined storage manner, an unimportant used queue context from the storage apparatus of the network interface card, to avoid a waste of prior resources of the storage apparatus caused by blind caching on the network interface card.

In another possible implementation, the network interface card obtains the context of the first queue or the context of the second queue from the memory of the source device through direct memory access DMA. By using the DMA technology, the network interface card can quickly obtain read speeds of the first queue context and the second queue context. In this way, a latency caused by using a processor of the device for data transmission can be avoided, and further processing efficiency of to-be-processed RDMA requests is improved.

In another possible implementation, when remaining space of the first storage region is less than a preset threshold, the network interface card uses a storage region of a size of a third threshold in the second storage region as an added storage region of the first storage region. The network interface card can preferentially ensure a storage manner of a queue context at a specified service level. When storage space of the first storage region is insufficient, the first storage region may be expanded by adding a new storage region, so that it is ensured that all queue contexts of the service application at the specified service level can be stored in determined storage manner. In this way, a transmission latency of a to-be-processed RDMA request of the service application of the service level is controlled.

In another possible implementation, when remaining space of the first storage region is less than a preset threshold, the network interface card stores a context of a third queue in the second storage region, where the context of the third queue is retained in the second storage region within the first time threshold. The context of the third queue indicates the identifier of the destination device and an identifier of a queue associated with the third queue in the destination device, and the third queue is used to store a to-be-processed RDMA request of a third service application. According to the foregoing method, by expanding the first storage region, it is ensured that there is sufficient storage space in the first storage region of the network interface card. In addition, a queue context associated with a service application at a specified service level may be directly stored in another storage region other than the first storage region, for example, the second storage region. It is ensured that storage duration of the queue context is the same as storage duration of data in the first storage region, to ensure that the queue context corresponding to the service application at the specified service level can be stored in the storage apparatus of the network interface card for a long time. A long processing latency caused by frequent access by the network interface card to the memory of the device can be avoided, and a processing latency of a to-be-processed RDMA request corresponding to a service application at a specified service level can be reduced.

In another possible implementation, when remaining space of the second storage region is less than a preset threshold, the network interface card stores the context of the second queue in the second storage region of the storage apparatus of the network interface card, and deletes a context of a fourth queue from the second storage region, where the context of the fourth queue indicates the identifier of the destination device and an identifier of a queue associated with the fourth queue in the destination device, and the fourth queue is used to store a to-be-processed RDMA request of a fourth service application. According to the foregoing method, the network interface card may replace a stored queue context with a queue context being used. This ensures that a processing latency of a to-be-processed RDMA request of a service application at a specified service level is controlled, and therefore a latency requirement of the service level is met.

In another possible implementation, when remaining space of the second storage region is less than a preset threshold, the network interface card stores the context of the second queue in the second storage region of the storage apparatus of the network interface card, and deletes a context of a fifth queue from the second storage region, where the context of the fifth queue indicates the identifier of the destination device and an identifier of a queue associated with the fifth queue in the destination device, the fifth queue is used to store a to-be-processed RDMA request of a fifth service application, and a storage level of the context of the fifth queue is lower than that of the context of the second queue. According to the foregoing method, the network interface card may replace a queue context at a lower storage level with a queue context corresponding to a service application at a specified service level, thereby saving the storage space and preferentially ensuring processing of a request of an important service application.

In another possible implementation, when remaining space of the second storage region is less than a preset threshold, the network interface card stores the context of the second queue in the second storage region of the storage apparatus of the network interface card, and deletes a context of a sixth queue from the second storage region, where the context of the sixth queue indicates the identifier of the destination device and an identifier of a queue associated with the sixth queue in the destination device, the sixth queue is used to store a to-be-processed RDMA request of a sixth service application, and a storage level of the context of the sixth queue is the lowest among storage levels of contexts of all queues in the second storage region. According to the foregoing method, the network interface card may replace a queue context at the lowest storage level with a queue context corresponding to a service application at a specified service level, thereby saving the storage space and preferentially ensuring processing of a request of an important service application.

In another possible implementation, the network interface card determines whether a deleted context is dirty data. If yes, the network interface card stores the deleted context in a context cache region of a corresponding queue in the memory. If no, the network interface card directly deletes the deleted context. According to the foregoing method, the network interface card can synchronize a queue context in the memory and a queue context in the storage apparatus.

In another possible implementation, the network interface card obtains the first to-be-processed RDMA request from the memory of the source device, and stores the first to-be-processed RDMA request in the storage apparatus of the network interface card. The network interface card sends the first to-be-processed RDMA request to the destination device. That after sending the first to-be-processed request to the destination device, the network interface card obtains the second to-be-processed request, and sends the second to-be-processed request to the destination device includes: The network interface card obtains the second to-be-processed RDMA request from the memory of the source device, stores the second to-be-processed RDMA request in the storage apparatus of the network interface card, and sends the second to-be-processed RDMA request to the destination device. The network interface card determines a processing sequence based on service levels of service applications, and completes data transmission of to-be-processed RDMA requests of different queues according to the determined processing sequence. In this way, a processing latency of a service application at a specified service level is ensured.

In another possible implementation, the network interface card is an intelligent network interface card that supports RDMA.

In another possible implementation, the network interface card includes a doorbell register, the doorbell register includes a notification message associated with each queue, the first notification message includes the service level of the first service application, and the second notification message includes the service level of the second service application. When notifying the network interface card that there is a to-be-processed RDMA request, the processor of the source device may notify the network interface card of a service level of a service application, so that the network interface card can arrange processing of the to-be-processed RDMA request in a sequence based on the service level. In addition, a processing latency of the to-be-processed RDMA request corresponding to the service application at the specified service level is controlled according to the determined processing sequence.

In another possible implementation, the first queue includes any one of a send queue SQ, a receive queue RQ, or a completion queue CQ, the send queue and the receive queue form a queue pair, and the context of the first queue includes a queue pair context or a completion queue context. It can be learned from the foregoing descriptions that, for processing of the SQ, RQ, and CQ, a processing latency of a to-be-processed RDMA request at a specified service level can be reduced according to the method provided in this application.

According to a second aspect, a network interface card is provided. The network interface card includes modules configured to perform the data transmission method in any one of the first aspect or the possible implementations of the first aspect.

According to a third aspect, a chip is provided, including a processor and a communication interface. The communication interface is configured to communicate with a processor of a device in which the chip is located. The processor of the chip is configured to implement functions of the steps of the method performed by the network interface card in any one of the first aspect or the possible implementations of the first aspect.

According to a fourth aspect, this application provides a device, including a first processor, a memory, and a network interface card. The first processor is configured to run a plurality of service applications, where each service application is associated with one queue. The memory is configured to store to-be-processed remote direct memory access RDMA requests in queues associated with the plurality of service applications. The network interface card is configured to implement functions of steps of the method performed by the network interface card in any one of the first aspect or the possible implementations of the first aspect.

According to a fifth aspect, a computer-readable storage medium is provided, where the computer-readable storage medium stores instructions. When the instructions are run on a computer, the computer is enabled to perform steps in the method in any one of the first aspect or the possible implementations of the first aspect.

A sixth aspect provides a computer program product including instructions. When the computer program product is run on a computer, the computer is enabled to perform the steps in the method in any one of the first aspect or the possible implementations of the first aspect.

In this application, based on the implementations provided in the foregoing aspects, combination may be performed to provide more implementations.

DESCRIPTION OF EMBODIMENTS

The following describes technical solutions in embodiments of this application with reference to the accompanying drawings.

Figure 1:
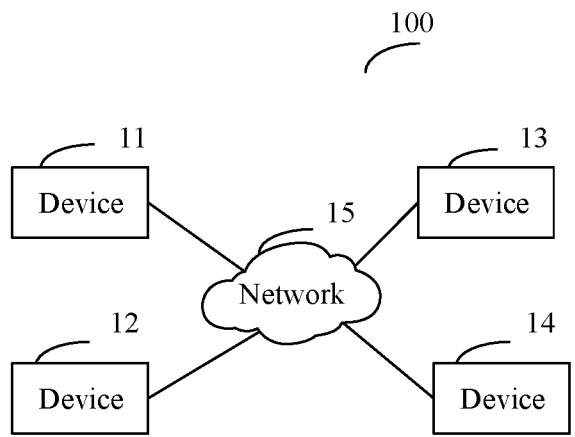
FIG. 1 is a schematic diagram of a structure of a data processing system 100 according to an embodiment of this application.

FIG. 1 is a schematic diagram of a structure of a data processing system 100 according to an embodiment of this application. The system 100 includes devices 11 to 14 and a network 15. Different devices communicate with each other through the network 15. The network 15 implements communication based on protocols that support the remote direct memory access (RDMA), for example, InfiniBand (IB), RDMA over Converged Ethernet (RoCE), and internet Wide Area RDMA Protocol (iWARP). In a specific implementation, one or more switches and/or routers may be used to implement communication between a plurality of nodes. For ease of description, in the data processing system 100 shown in FIG. 1, a device that sends a to-be-processed RDMA request may be referred to as a source device, and a device that receives a to-be-processed RDMA request may be referred to as a destination device.

The devices 11 to 14 may be computing devices (for example, servers), storage devices (for example, storage arrays), or other devices that support the RDMA technology. It should be understood that a quantity of devices in the system 100 does not constitute a limitation on this application. In FIG. 1, only an example in which the system includes four devices is used for description.

Figure 2:
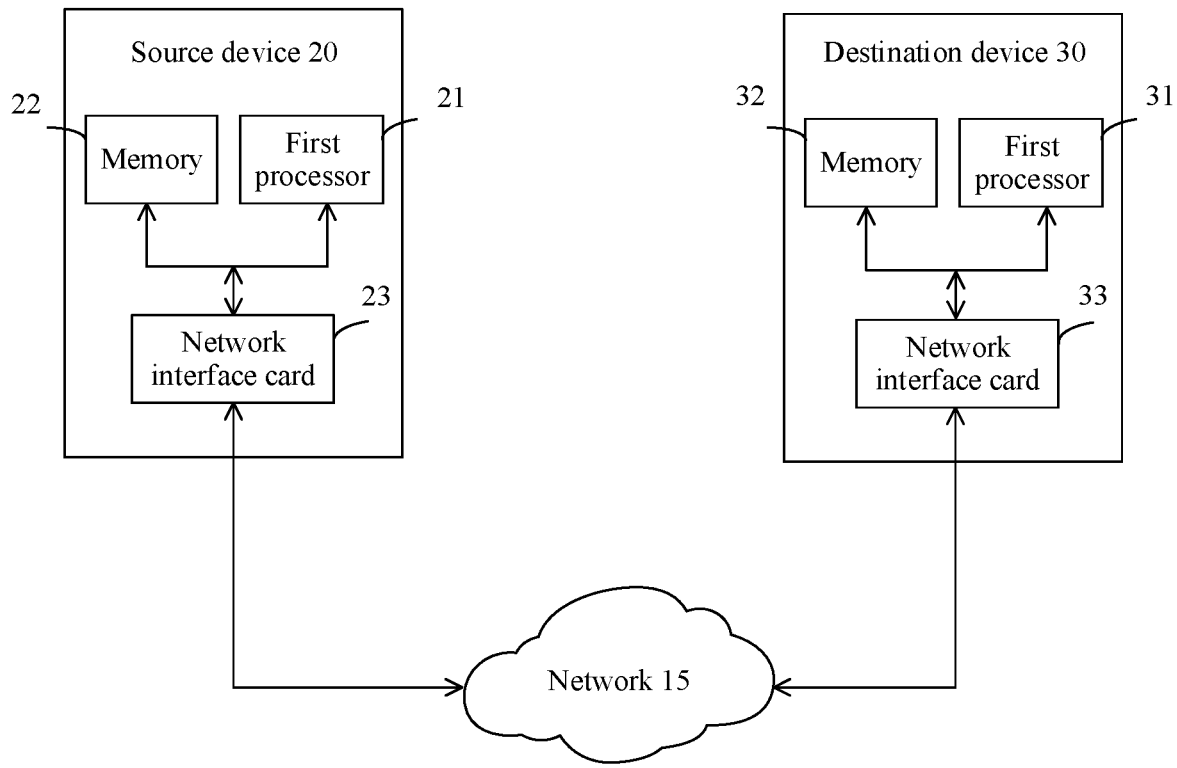
FIG. 2 is a schematic diagram of a structure of another data processing system according to an embodiment of this application.

With reference to FIG. 2, the following further explains a manner of communication based on the RDMA technology between a source device and a destination device.

FIG. 2 is a schematic diagram of a structure of another data processing system according to an embodiment of this application. In FIG. 2, an example including a source device 20 and a destination device 30 that apply an RDMA technology for data transmission is used for description. The source device 20 or the destination device 30 may be any device in FIG. 1.

The source device 20 includes a first processor 21, a memory 22, and a network interface card 23. The first processor 21, the memory 22, and the network interface card 23 are connected by a bus, for example, Peripheral Component Interconnect Express (PCIe). Alternatively, the bus may be a bus of another type for connection between components in a device. In addition to a data bus, the bus may further include a power bus, a control bus, a status signal bus, and the like.

The first processor 21 may be a central processing unit (CPU). Alternatively, the first processor 21 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. For ease of description, an example in which the first processor 21 is a CPU is used for description in the following embodiments.

The network interface card 23 may alternatively be referred to as a host channel adapter (HCA), and the network interface card 23 is an intelligent network interface card that supports the RDMA technology. In the RDMA technology, a processor does not participate in data transmission. Therefore, the source device 20 may directly send, by using the network interface card, data stored in the memory to the destination device 30 through the network 15, and a network interface card on the destination device 30 receives the data and stores the data in a memory.

In a possible embodiment, hardware structures of the source device 20 and the destination device 30 may be the same, or may be different. For ease of description, an example in which the hardware structures of the source device 20 and the destination device 30 are the same is used for description in the following embodiments.

Figure 3:
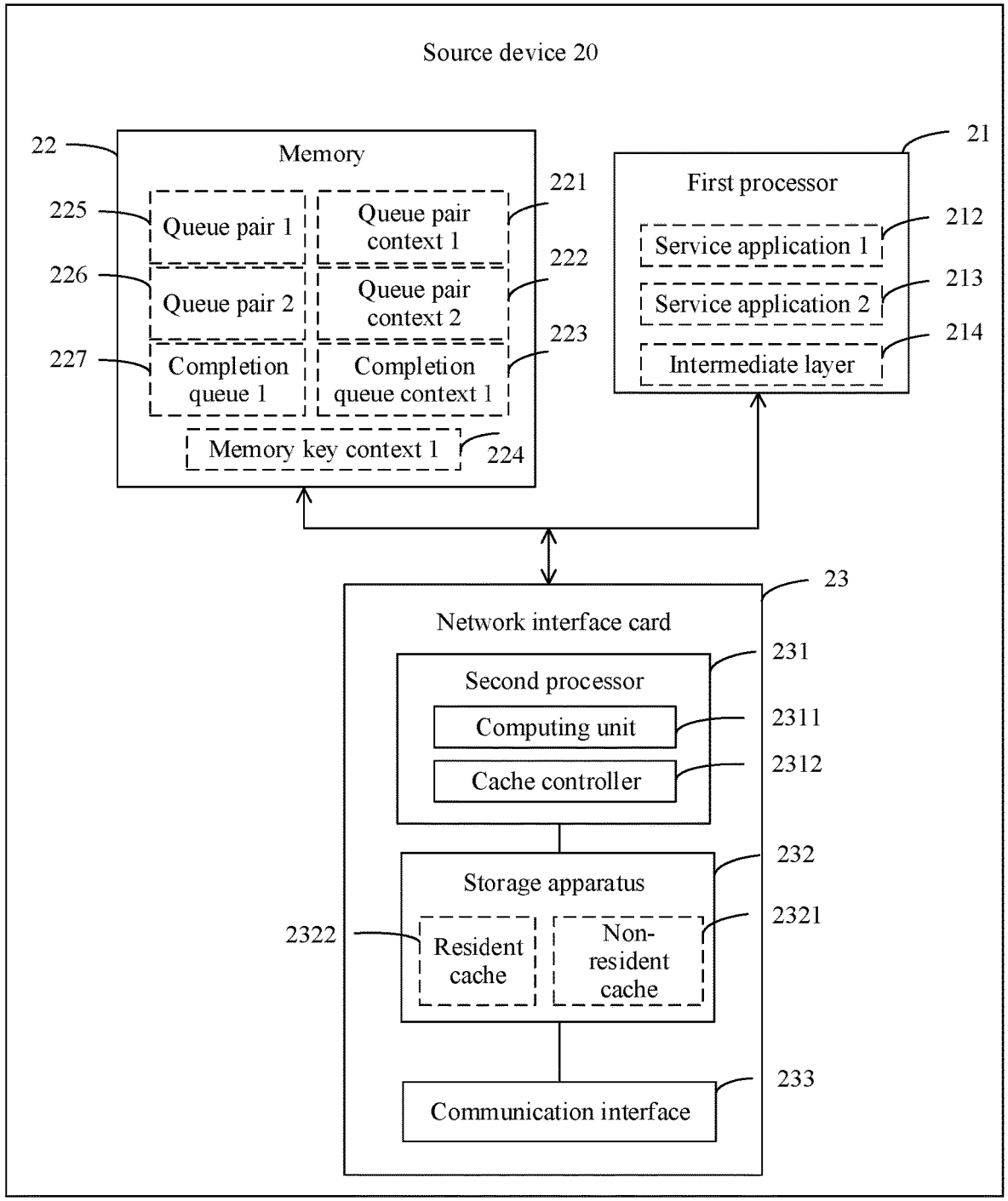
FIG. 3 is a schematic diagram of a structure of a source device 20 according to an embodiment of this application.

Next, the source device 20 is further described with reference to FIG. 3. FIG. 3 is a schematic diagram of a structure of a source device 20 according to an embodiment of this application.

A plurality of service applications, for example, a service application 1 and a service application 2, run in the first processor 21. Each service application may generate a work request (WR), including an RDMA write request, an RDMA read request, and an RDMA send/receive request. The service applications include a database application, a high performance computing (HPC) application, and the like.

Optionally, the service application may further generate a work request by invoking an interface provided by an intermediate layer. For example, in a high performance computing scenario, service applications may generate different parallel computing requests, for example, a non-blocking communication request and a collective operation request, by invoking application programming interfaces (APIs) applying a plurality of parallel computing technologies provided by a message passing interface (MPI). In a storage scenario, a service application may generate a data transmission request by invoking an Exploitation Network (xNet) communication component.

The memory 22 can store a work request generated by a service application, data transmitted by a service application, and a data structure used in an RDMA transmission process. For example, an interconnect context memory (ICM) is used in a memory to store a work request generated by a service application, and the interconnect context memory may be a storage region in the memory. Specifically, in the RDMA technology, a queue pair (QP) (for example, a queue pair 1 and a queue pair 2 shown in FIG. 1) may be used to store a work request of a service application. In addition, the interconnect context memory is further configured to store a queue pair context (QPC) (for example, a queue pair context 1 and a queue pair context 2 shown in FIG. 1), a completion queue (CQ), a completion queue context (CQC), and a memory key context (MKC).

A QP is also referred to as a network transmission queue pair. When a source device communicates with a destination device by using the RDMA technology, the first processor 21 of the source device allocates at least one queue pair to each service application. Each queue pair includes one send queue (SQ) and one receive queue (RQ). The SQ is used to store a work request sent by a service program to the destination device, and the RQ is used to store a work request that is sent by the destination device and that is received by a service program. Each SQ of a data transmit end is associated with an RQ of a data receive end. Each SQ or each RQ includes a plurality of entries. Each entry may also be referred to as a work queue entry (WQE). Each WQE is used to store an RDMA request generated by a service application, which is also referred to as a work request (WR).

Figure 4:
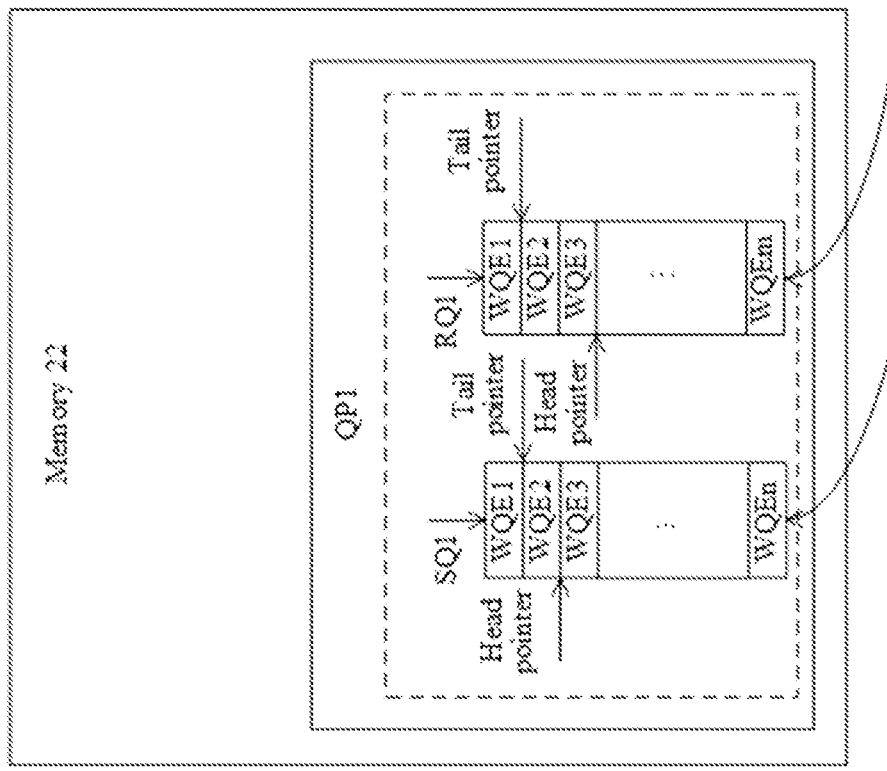
FIG. 4 is a schematic flowchart of QP-based communication between devices according to an embodiment of this application.
Figure 4:
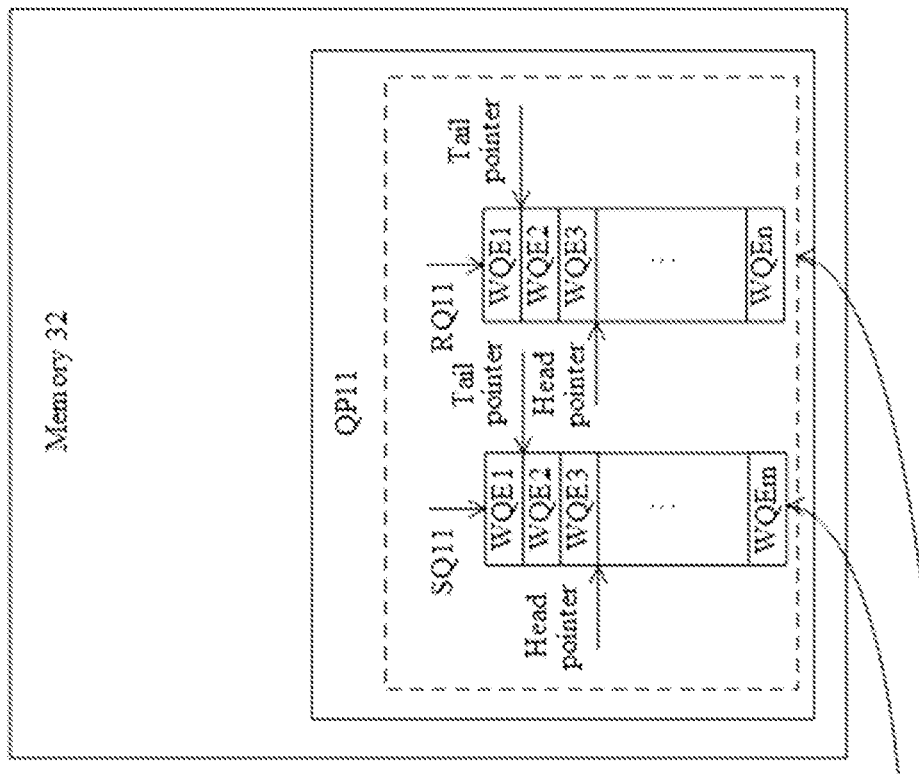

The source device 20 and the destination device 30 may communicate with each other based on a queue pair. Specifically, FIG. 4 is a schematic flowchart of QP-based communication between devices according to this embodiment. As shown in the figure, the source device 20 and the destination device 30 establish a communication connection at an initialization phase based on a QP1 and a QP11, so that a service program deployed on the source device communicates with the QP11 of the destination device based on the QP1 of the source device. The QP1 includes an SQ1 and an RQ1, and the QP11 includes an SQ11 and an RQ11. When the SQ1 is associated with the RQ11, an RDMA send request generated by a service application running on the source device 20 may be stored in a WQE of the SQ1. In addition, a first processor of the destination device 30 generates an RDMA receive request and stores the RDMA receive request in a WQE of the RQ11. Similar to the SQ1 and the RQ11, when the RQ1 is associated with the SQ11, an RDMA receive request generated by a service application running on the source device 20 may be stored in the WQE of the SQ1. In addition, the first processor of the destination device 30 generates an RDMA send request and stores the RDMA send request in the WQE of the RQ11.

Further, a head pointer and a tail pointer may be used to indicate a WQE storage status in a queue. For example, as shown in FIG. 4, a head pointer of the SQ1 points to an address of a WQE2, and a tail pointer of the SQ1 points to an address of a WQE1. In this case, only the WQE2 in the SQ1 stores an RDMA request. When a service application running on the device 20 generates an RDMA send request, the first processor 21 stores the request in a WQE3 of the SQL. In this case, the head pointer of the SQ1 moves downwards by one storage unit to a corresponding storage location, namely, the WQE3. When the network interface card fetches, from the SQ1, the RDMA request stored in the WQE2, the tail pointer of the SQ moves downwards by one storage unit to a corresponding storage location, namely, the WQE2.

Each QP corresponds to one QPC, and the QPC is used to store configuration data of the QP. Table 1 is an example of a QPC data format. It should be noted that Table 1 is merely an example, and does not constitute a limitation on the QPC data format. The QPC data format may further include another field.

TABLE 1

QPC data format

| Field | Meaning |
| --- | --- |
| QPN | Indicates a number of a QP, where each QP corresponds to a unique number. |
| QPN of a destination device | Indicates a number of the other QP in a QP pair. |
| SQ address | Indicates an address of storage space for storing an SQ. |
| SQ address index | Indicates an Address of a storage unit to which a tail pointer of a storage SQ points. |

As shown in Table 2, the network interface card may find, according to an SQ address in a QPC, an address of storage space of an SQ storing a to-be-processed RDMA request, and then find an address of the to-be-processed RDMA request based on an SQ address index.

A CQ includes a plurality of completion queue elements (CQEs), and is used to store a notification returned to a service application after the network interface card completes execution of a work request or after the network interface card completes execution of a work request and receives a response from the destination device, where the notification includes a flag indicating whether a request is executed correctly and error code. Similar to the QP, each CQ corresponds to a CQC and stores a CQ-related attribute.

Figure 5:
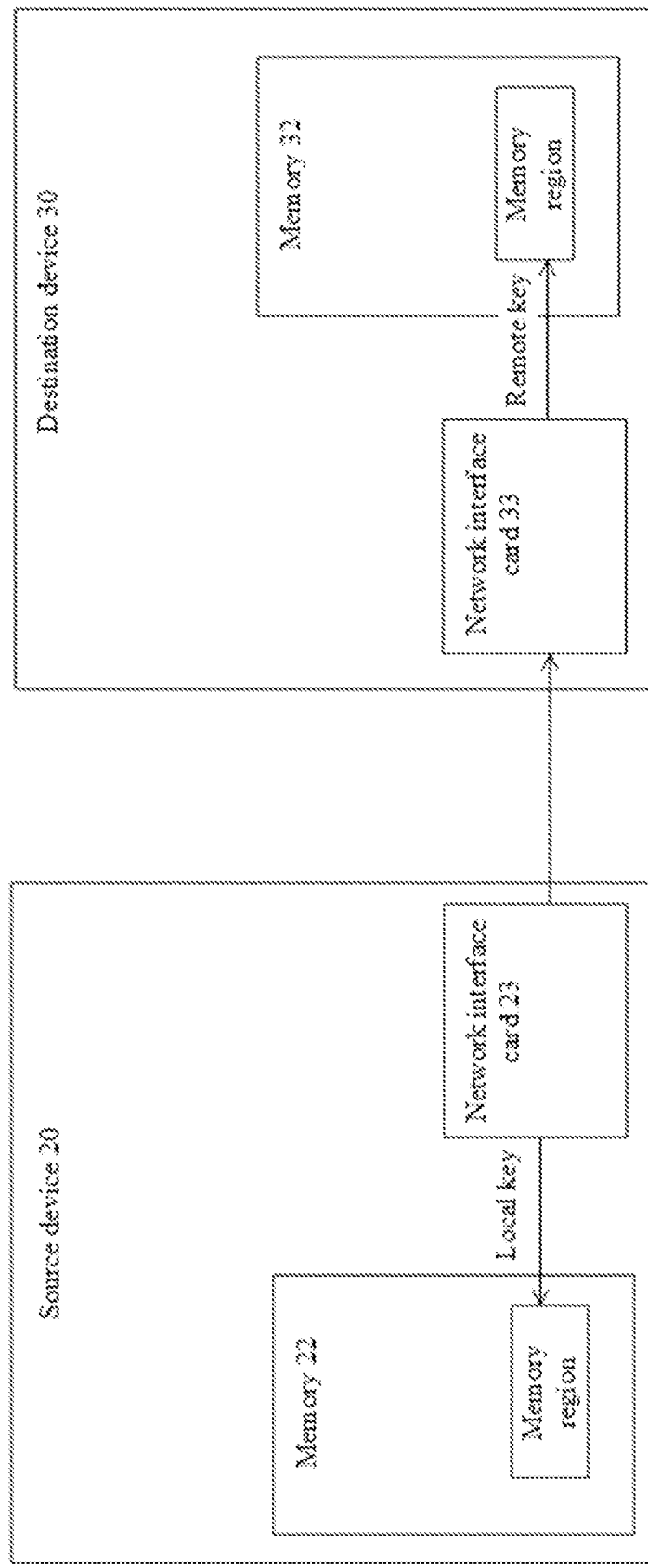
FIG. 5 is another schematic flowchart of QP-based communication between devices according to an embodiment of this application.

Before the source device and the destination device perform RDMA communication, the first processor 21 allocates a storage region in the memory to a service application of the source device, which is used to store to-be-sent and to-be-received data in work requests sent by the service application. The storage region is referred to as a memory region (MR). The memory region may store authentication identifiers of the source device and the destination device, for example, a local key (L_KEY) and a remote key (R_KEY). The local key is used to store access permission for a memory region of the source device. The remote key is used to store access permission for a memory region of the destination device. FIG. 5 is another schematic flowchart of QP-based communication between devices according to an embodiment of this application. As shown in FIG. 5, when the network interface card of the source device 20 accesses a registration area in the device, a local key is needed. When the source device obtains data of the destination device 30, the destination device 30 needs to use a remote key to access the registration area of the device. Each MR corresponds to an MKC that is used to store an authentication identifier of the MR and an address conversion relationship and that includes a local key, a remote key, and a mapping table for mapping a logical address (LBA) to a physical address (PBA). The mapping table may obtain a physical address of to-be-transmitted data stored in the memory based on a logical address of the to-be-transmitted data stored in the WQE.

The memory 22 may include a read-only memory and a random access memory, and provides instructions and data to the first processor 21. The memory 22 may be a volatile memory or a non-volatile memory, or may include a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through example but not limitative description, RAMs in a plurality of forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The network interface card 23 is a network interface card that supports an RDMA function, and supports a user-defined or standard RDMA protocol network port, for example, at least one of the IB protocol, the RoCE protocol, and the iWAPP protocol.

It should be noted that one device may include at least one network interface card, and each network interface card can independently process a work request. As shown in FIG. 3, the network interface card 23 includes a second processor 231, a storage apparatus 232, and a port 233. For simplicity, elements of the network interface card 23 that are not indispensable for understanding the present invention are omitted.

Usually, the first processor 21 allocates an address range in memory space to the network interface card. When there is a to-be-executed work request in a QP, the first processor 21 notifies the network interface card by changing an identifier corresponding to the QP in a doorbell register of the network interface card 23. In response to the doorbell, a calculation unit 2311 of the network interface card obtains a QPC that is of the QP and that is indicated by the doorbell. An RDMA read request is used as an example. The calculation unit 2311 determines a location of the to-be-executed RDMA request in a send queue based on an SQ address and an SQ address index in the QPC, takes out the work request, and executes the work request.

After the work request is completed, the computing unit 2311 generates a CQE and stores the CQE in a CQ to notify a service application of a completion status of the request. Similar to the QP, the computing unit also needs to use a CQC corresponding to the CQ when generating the CQE.

As described above, when processing a work request of a service application, the computing unit 2311 needs to use a QPC, an MKC, and a CQC. To improve processing performance of the network interface card, the QPC, the MKC, and the CQC may be stored in the storage apparatus 232 of the network interface card.

Due to a limited capacity of the storage apparatus, the storage apparatus of the network interface card cannot store all QPCs, MKCs, and CQCs used by service applications. Therefore, when the storage space of the storage apparatus of the network interface card is insufficient, a QPC, an MKC, and a CQC of an important service application may be preferentially stored.

Resident cache space 2322 and non-resident cache space 2321 may be allocated in the space of the storage apparatus of the network interface card. When the space of the storage apparatus is insufficient, within a first time threshold, a QPC stored in the resident cache is not replaced, and a QPC stored in the non-resident cache is replaced. A storage control module 4312 may be used to manage the space of the storage apparatus, to complete QPC replacement.

The QPC is used as an example. Correspondingly, QPC storage types may be further classified into resident storage and non-resident storage based on QPC storage manners. When the space of the storage apparatus is insufficient, a resident QPC is not replaced by a new QPC within the first time threshold, and the non-resident QPC may be replaced by a new QPC within the first time threshold. A replacement method includes random replacement or a least recently used (LRU) replacement policy.

Optionally, a storage level may be further used to identify a storage type of a QPC. A QPC of each storage type may correspond to at least one storage level. For example, QPCs at storage levels 4 and 5 are designated as resident QPCs. For non-resident QPCs, a replacement sequence of QPCs may be determined based on the storage levels. A QPC at a low storage level is preferentially replaced. An existing field in the RDMA transmission protocol, for example, a service level SL field in the IB protocol, may be directly used to identify the QPC storage level. Optionally, a new user-defined field in the RDMA transmission protocol may be alternatively used to identify the QPC storage level.

It should be noted that various units forming the network interface card 23 may be implemented as a hardware circuit or a software process run on a programmable processor, or may be implemented as a combination of elements implemented by hardware and software.

Based on the system in which the source device communicates with the destination device by using the RDMA technology in FIG. 2, an embodiment of this application provides a data processing method. According to the method, an RDMA request of a service application at a specified service level is preferentially processed, and a QPC corresponding to the service application at the specified service level may be stored in the storage apparatus of the network interface card, which leads to improvement in a speed of transmitting a work request of a service application.

With reference to FIG. 1 to FIG. 5, the foregoing describes in detail the structure of the data processing system provided in embodiments of this application. With reference to FIG. 6 to FIG. 8B, by using an RDMA read request as an example, the following describes a method for preferentially processing an RDMA request of a service application at a specified service level.

Figure 6:
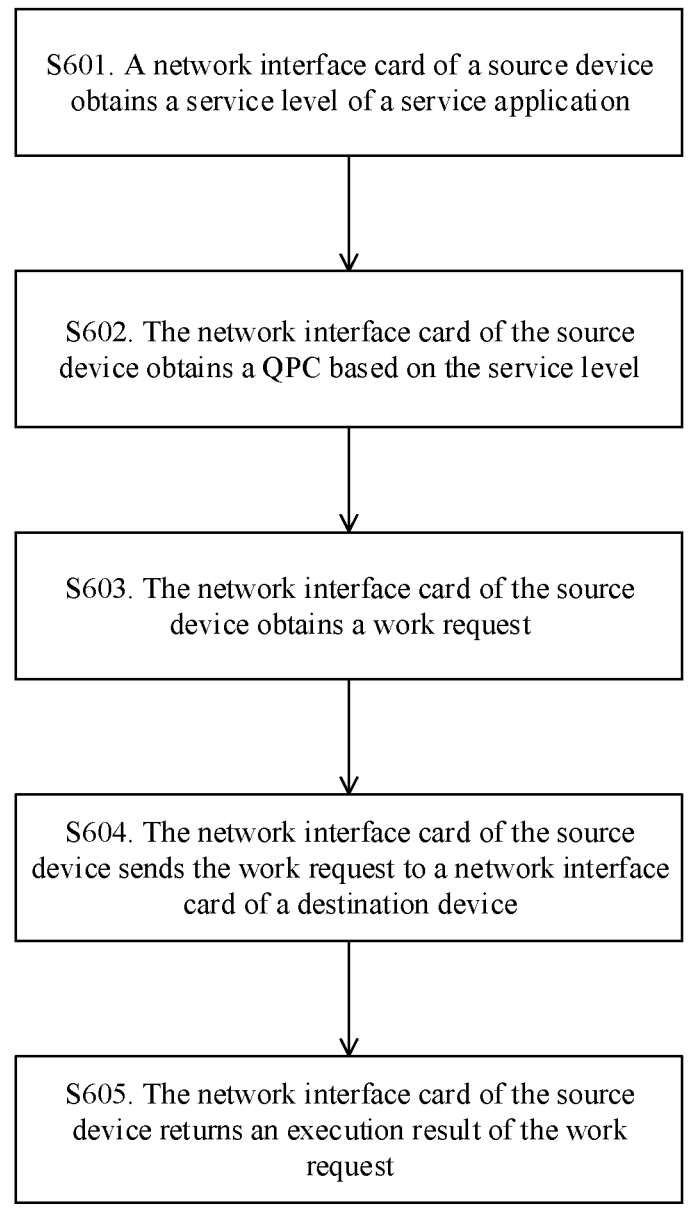
FIG. 6 is a schematic flowchart of a data processing method according to this application.

FIG. 6 is a schematic flowchart of a data processing method according to an embodiment of this application. Specifically, the method includes the following steps.

S601. A network interface card of a source device obtains a service level of a service application.

A work request generated by the service application is placed in a queue allocated by a first processor to the service application. For example, the work request may be a to-be-processed RDMA write request, and is placed in an SQ allocated by the first processor. The first processor interacts with a doorbell module of the network interface card through a software/hardware interface, to notify the network interface card that a to-be-processed RDMA write request exists in the SQ. When sending notification information to the network interface card, the first processor may also send a service level of a service application to the network interface card together. The service level of the service application may be determined based on a performance requirement of the service application, for example, a bandwidth requirement of the service application or latency sensitivity of the service application.

When there are both to-be-processed RDMA write requests in at least two SQ queues, after obtaining service levels of service applications, the network interface card determines a processing sequence of the to-be-processed RDMA requests according to the service levels of the service applications. For example, a first SQ stores a first to-be-processed RDMA write request generated by a first service application, and a second SQ queue stores a second to-be-processed RDMA write request generated by a second service application, where it is specified that a service level of the first service application is higher than a service level of the second service application. In this case, the network interface card preferentially processes the first to-be-processed RDMA request in the first SQ.

S602. The network interface card of the source device obtains a QPC based on the service level.

The network interface card first obtains, from a memory based on the service level of the service application and a QPN of the SQ in which the first to-be-processed RDMA request generated by the first service application is located, a QPC corresponding to the SQ. Based on storage manners of QPCs, the network interface card stores the QPCs in different types of storage space. Specifically, a QPC whose storage type is resident storage is stored in a resident cache, and a QPC whose storage type is non-resident storage is stored in a non-resident cache.

In a possible embodiment, the network interface card searches, based on the QPN, a storage apparatus of the network interface card for a QPC corresponding to the SQ. As shown in FIG. 3, the calculation unit 2311 may perform search. When the QPC exists in the storage apparatus, the network interface card directly obtains the QPC from the storage apparatus. When the QPC does not exist in the storage apparatus, the network interface card obtains, from the memory based on the QPN, the QPC corresponding to the SQ.

Optionally, the network interface card may obtain the QPC from the memory of the source device through direct memory access DMA.

Optionally, if the storage type of the QPC is resident storage and the QPC is stored in the non-resident cache, the network interface card may further determine whether the resident cache has remaining space. As shown in FIG. 3, a cache controller 2312 may perform determining. If the resident cache has remaining space, the network interface card migrates the QPC from the non-resident cache to the resident cache and releases original storage space.

The computing unit in the network interface card may determine the QPC storage manner according to at least one of the following rules.

Rule 1: A QPC storage manner is determined based on a service level of a service application associated with an SQ being used. A storage type of a QPC corresponding to an SQ used by a service application at a specified service level may be set to resident storage, and the QPC is stored in the resident cache. Storage types of QPCs corresponding to other service levels are set to non-resident storage, and the QPCs are stored in the non-resident cache. Optionally, the service level may be used as a storage level of the QPC.

Rule 2: The network interface card may obtain, from the first processor, transmission characteristics of all SQs being used, for example, an operation type of a to-be-processed work request in the SQ, a size of a data packet in a to-be-processed RDMA request in the SQ, or a use frequency of the SQ. Determining a QPC storage type based on at least one transmission characteristic includes the following cases.

(1) Determine a QPC storage manner based on an operation type of the first to-be-processed RDMA write request in the SQ. Storage types of QPCs of all SQs used for one operation type may be specified. For example, in a high performance computing (HPC) scenario, a message passing interface (MPI) is needed to transfer messages between different processes. In the MPI standard, an application interface for a persistent collective operation is defined. The application interface fixes parameters of sending and receiving interfaces, including quantities, types, and lengths of the parameters. Compared with conventional operation types, a fixed QP, CP, and MK are used for each transmission in a persistent collective operation. Therefore, storage types of the QPCs of all SQs used for the persistent collective operation may be set to resident storage, and the QPCs are stored in the resident cache. Optionally, storage levels of QPCs of all SQs used for one operation type may be specified.

(2) Determine a QPC storage manner based on a size of a data packet in the first to-be-processed RDMA request in the SQ. A storage type of a QPC corresponding to an SQ used by a data packet less than a first threshold may be set to resident storage, and the QPC is stored in the resident cache. Storage types of other QPCs are set to non-resident storage and the QPCs are stored in the non-resident cache. For example, a storage type of a QPC corresponding to a data packet less than 128B may be set to resident storage, and the QPC is stored in the resident cache. If a data packet is small, a queue context in the memory needs to be frequently obtained in a process in which the network interface card sends each data packet. The queue context may be stored in the storage apparatus of the network interface card, to prevent the network interface card from frequently accessing the memory, so as to reduce a data transmission latency. Optionally, the QPC storage level may be set based on a data packet size. An SQ with a smaller data packet corresponds to a higher QPC storage level.

(3) Determine a QPC storage manner based on an SQ usage frequency, which refers to a quantity of to-be-processed RDMA requests stored in an SQ within a second time threshold. A storage type of a QPC corresponding to an SQ whose usage frequency is greater than a second threshold is set to resident storage, and the QPC is stored in the resident cache. Storage types of other QPCs are set to non-resident storage, and the QPCs are stored in the non-resident cache. Optionally, the QPC storage level may be set based on a QP usage frequency. A higher usage frequency of an SQ indicates a higher storage level of a QPC corresponding to the SQ.

The network interface card may set sizes of resident cache storage space and non-resident cache storage space in the storage apparatus based on a communication capability of the network interface card (for example, a size of a RAM on a network interface card chip) and a requirement of a transmission task of a service application (for example, bandwidth required by the transmission task or sensitivity of the transmission task to a latency).

In a possible embodiment, before the network interface card obtains the QPC storage manner, a network management device (not shown in FIG. 1) may be used to configure a network interface card on a device that performs data transmission, where the network management device may be an independent server connected to a same network as the source device, or may be the source device. The network management device may obtain communication capabilities of network interface cards of all devices in the network, and may configure space sizes of a resident cache and a non-resident cache on each network interface card based on the communication capabilities of the network interface cards and a requirement of a transmission task of a service application.

S603. The network interface card of the source device obtains the work request.

The network interface card of the source device obtains a location of the first to-be-processed RDMA write request according to an SQ address and an SQ address index in the obtained QPC, and obtains the request.

Optionally, the network interface card may obtain the first to-be-processed RDMA request from the memory of the source device through direct memory access DMA.

Optionally, after obtaining the first to-be-processed RDMA request, the network interface card may further store a QP in the storage apparatus, so that the network interface card may directly re-read the work request from the storage apparatus when sending of the first to-be-processed RDMA request fails.

S604. The network interface card of the source device sends the work request to a network interface card of a destination device.

After obtaining the first to-be-processed RDMA request, the network interface card encapsulates the request into a corresponding data format according to a specific protocol supported by the network interface card, and sends the request to the destination device.

Optionally, the network interface card of the source device sends the service level of the service application and the work request to the network interface card of the destination device.

S605. The network interface card of the source device returns an execution result of the work request.

After the sending is complete, the network interface card records an execution result of an SQ in a CQ. When a connection between the network interface cards of the source device and the destination device is reliable, the network interface card of the source device needs to generate an execution result after the network interface card of the destination device returns a receive response. When a connection between the network interface cards of the source device and the destination device is unreliable, the network interface card of the source device may immediately generate an execution result. A CQC is required when the network interface card puts the execution result in the CQ.

A manner of obtaining and storing the CQC by the network interface card may be similar to the manner of processing the QPC.

It should be noted that the data transmission method performed by the destination device may be the similar to the method performed by the source device, or may be other methods. The data processing method performed by the destination device is not limited.

It can be learned from the descriptions of the foregoing process that, according to the data processing method provided in this embodiment of this application, a work request of a service application at a specified service level may be preferentially transmitted based on a service level of the service application, and a QPC can be stored in a storage apparatus of a network interface card in a determined storage manner based on the service level of the service application and a transmission characteristic of a QP, so that the network interface card can preferentially ensure transmission efficiency of an RDMA request of a service application at a specified service level.

Figure 7A:
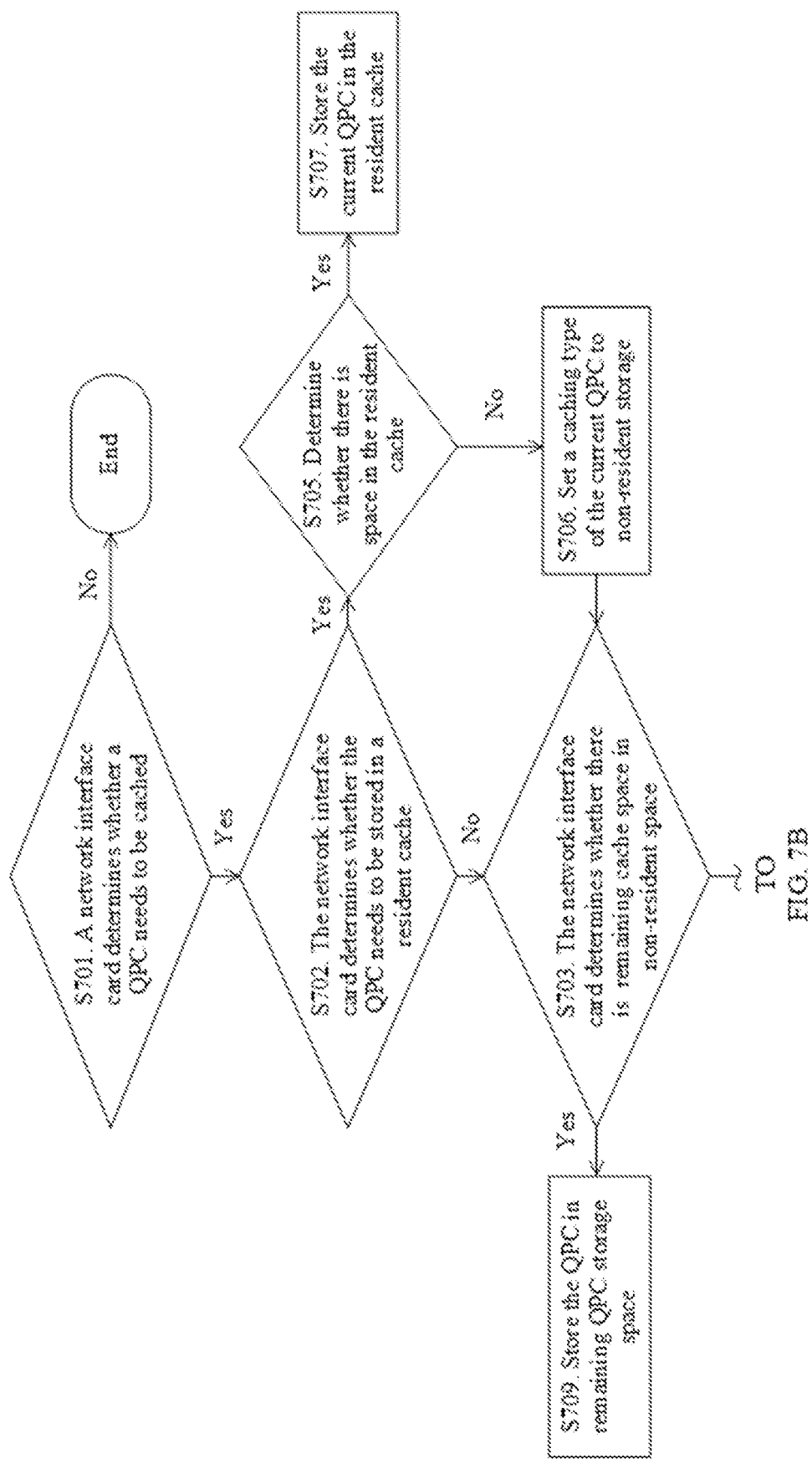
FIG. 7A and FIG. 7B are a schematic flowchart of a QPC caching method according to this application.
Figure 7B:
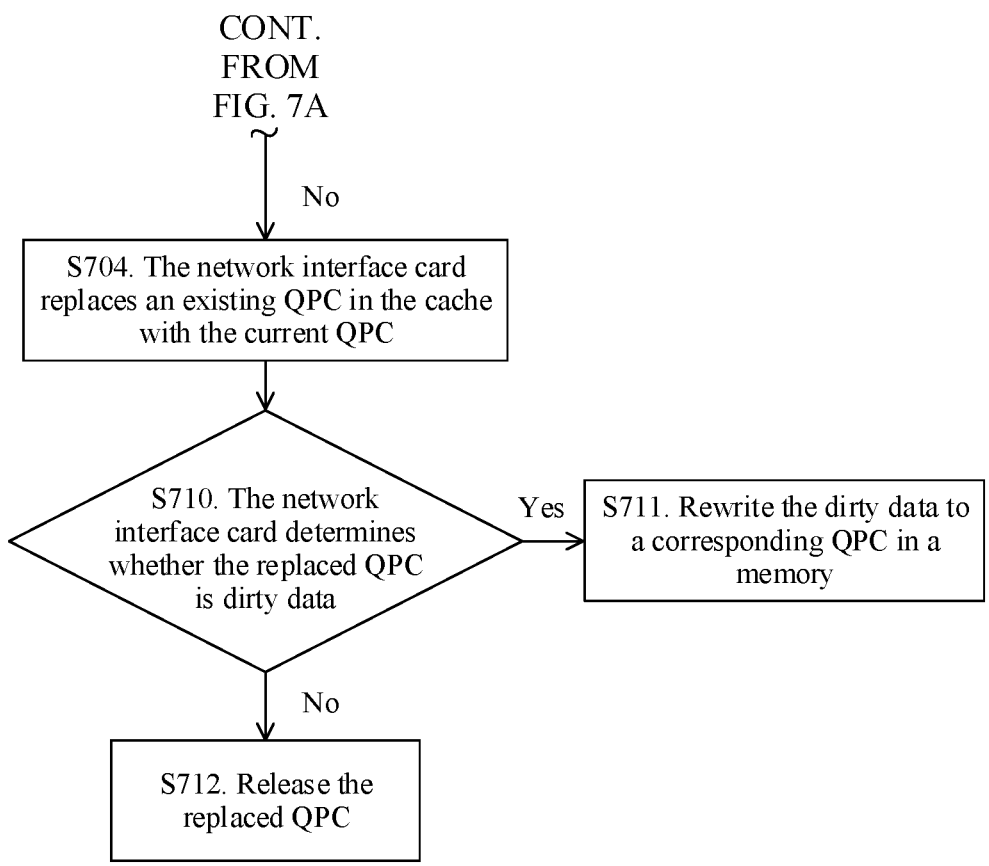

FIG. 7A and FIG. 7B are a schematic flowchart of a QPC caching method according to an embodiment of this application. Specifically, the method includes the following steps.

S701. A network interface card determines whether a QPC needs to be cached. If yes, S702 is performed. If no, a current QPC does not need to be cached.

S702. According to the method in S603, the network interface card determines whether the QPC needs to be stored in a resident cache.

If yes, S705 is performed to determine whether the resident cache has remaining storage space. When there is no remaining storage space, S706 is performed to set a storage type of the current QPC to non-resident storage, and then S703 is performed. When there is remaining space, S707 is performed to store the current QPC in the resident cache.

If no, S703 is performed.

S703. The network interface card determines whether non-resident space has remaining storage space.

When there is remaining storage space, S709 is performed to store the QPC in remaining QPC storage space.

When there is no remaining storage space, the network interface card performs S704.

S704. The network interface card replaces an existing QPC with the current QPC, where a replacement policy may be any one of the following policies.

Policy 1: The current QPC replaces an existing QPC whose storage type is non-resident storage in the cache.

Policy 2: The current QPC replaces an existing QPC whose storage level is lower than that of the current QPC in the cache.

Policy 3: The current QPC replaces an existing QPC at the lowest storage level among all current QPCs in the cache.

S710. The network interface card determines whether the replaced QPC is dirty data.

If yes, the network interface card performs S711 to rewrite the dirty data to a corresponding QPC in a memory.

If no, the network interface card performs S712 to release the replaced QPC.

It can be learned from the descriptions of the foregoing process that the network interface card can preferentially ensure a storage manner of a QPC at a specified service level. When storage space of a first storage region is insufficient, the first storage region may be expanded by adding a new storage region, so that it is ensured that all QPCs of a service application at a specified service level can be stored in a determined storage manner. In this way, a transmission latency of a to-be-processed RDMA request of the service application at the service level can be controlled.

Figure 8A:
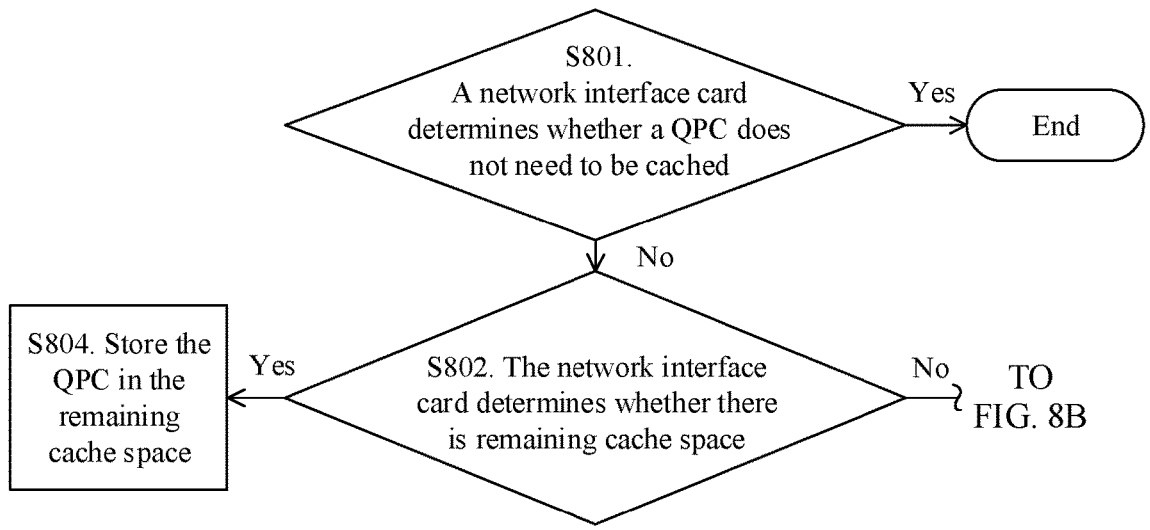
FIG. 8A and FIG. 8B are a schematic flowchart of another QPC caching method according to this application.
Figure 8B:
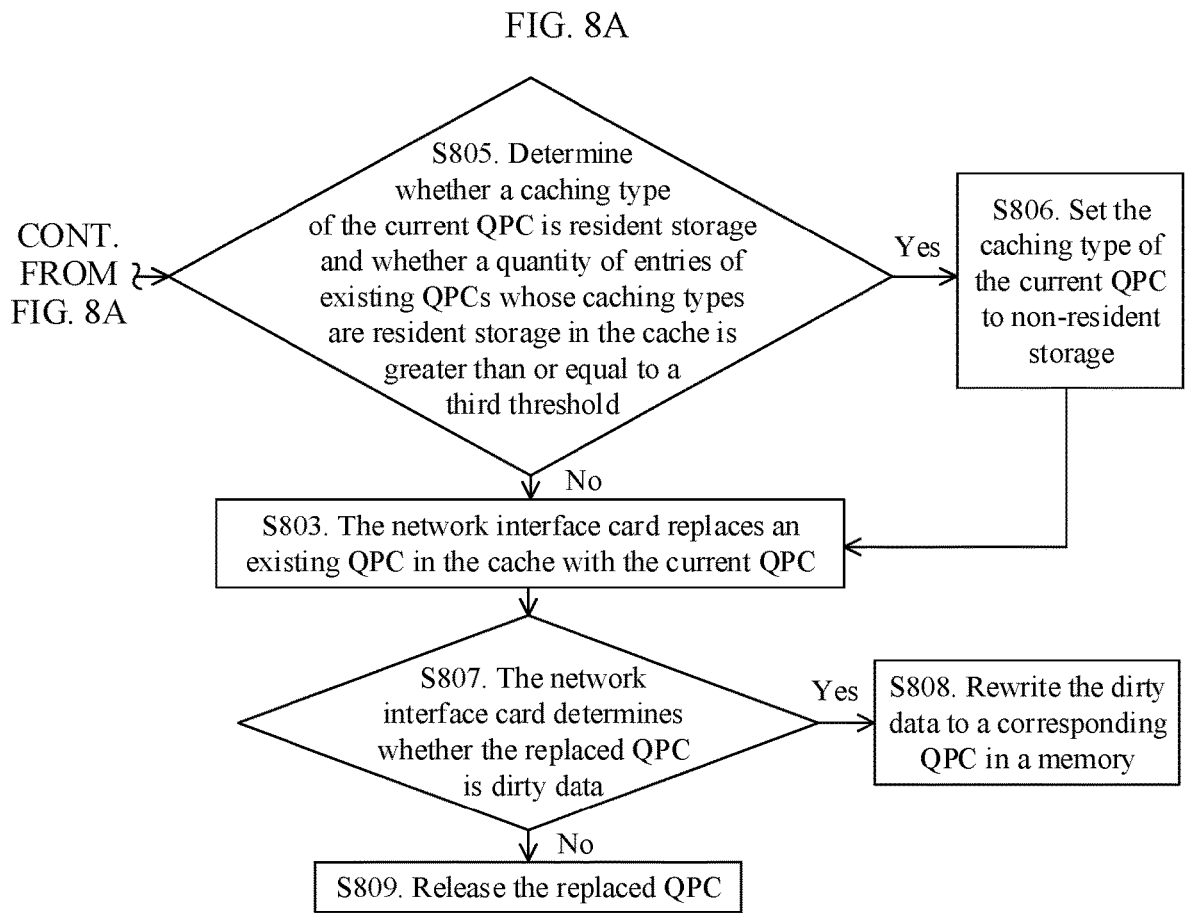

FIG. 8A and FIG. 8B is a schematic flowchart of another QPC caching method provided in this application. In the method shown in FIG. 8A and FIG. 8B, a network interface card only needs to determine a storage type of a QPC to determine whether to store a QPC in a storage apparatus for a long time, and does not specify a designated storage region. As shown in the figure, the method specifically includes the following steps.

S801. The network interface card determines whether a QPC needs to be cached. If yes, S802 is performed. If no, the current QPC does not need to be cached, and S604 is directly performed.

S802. The network interface card determines whether the storage apparatus has remaining cache space.

When there is remaining cache space, a cache controller performs S804 to directly store the QPC in the remaining cache space.

When there is no remaining cache space, S805 is performed to determine whether a storage type of the current QPC is resident storage and whether a quantity of entries of existing QPCs whose storage types are resident storage in the cache is greater than or equal to a third threshold. When a determining result is yes, the network interface card performs S806 to set the storage type of the current QPC to non-resident storage, and then performs S803. When a determining result is no, the cache controller directly performs S803.

S803. The network interface card replaces an existing QPC with the current QPC, where a replacement policy may be any one of the following policies.

Policy 1: The current QPC replaces an existing QPC whose storage type is non-resident storage in the cache.

Policy 2: The current QPC replaces an existing QPC whose storage level is lower than that of the current QPC in the cache.

Policy 3: The current QPC replaces an existing QPC at the lowest storage level among all current cached QPCs in the cache.

S807. The network interface card determines whether the replaced QPC is dirty data.

If yes, the network interface card performs S808 to rewrite the dirty data to a corresponding QPC in a memory.

If no, the cache controller performs S809 to release the replaced QPC.

According to the foregoing method, by expanding the first storage region, it is ensured that there is sufficient storage space in the first storage region of the network interface card. In addition, a queue context associated with a service application at a specified service level may be directly stored in another storage region other than the first storage region, for example, the second storage region. It is ensured that storage duration of the queue context is the same as storage duration of data in the first storage region, to ensure that the queue context corresponding to the service application at the specified service level can be stored in the storage apparatus of the network interface card for a long time. A long processing latency caused by frequent access by the network interface card to a memory of a device can be avoided, and a processing latency of a to-be-processed RDMA request corresponding to a service application at a specified service level can be reduced.

Figure 9:
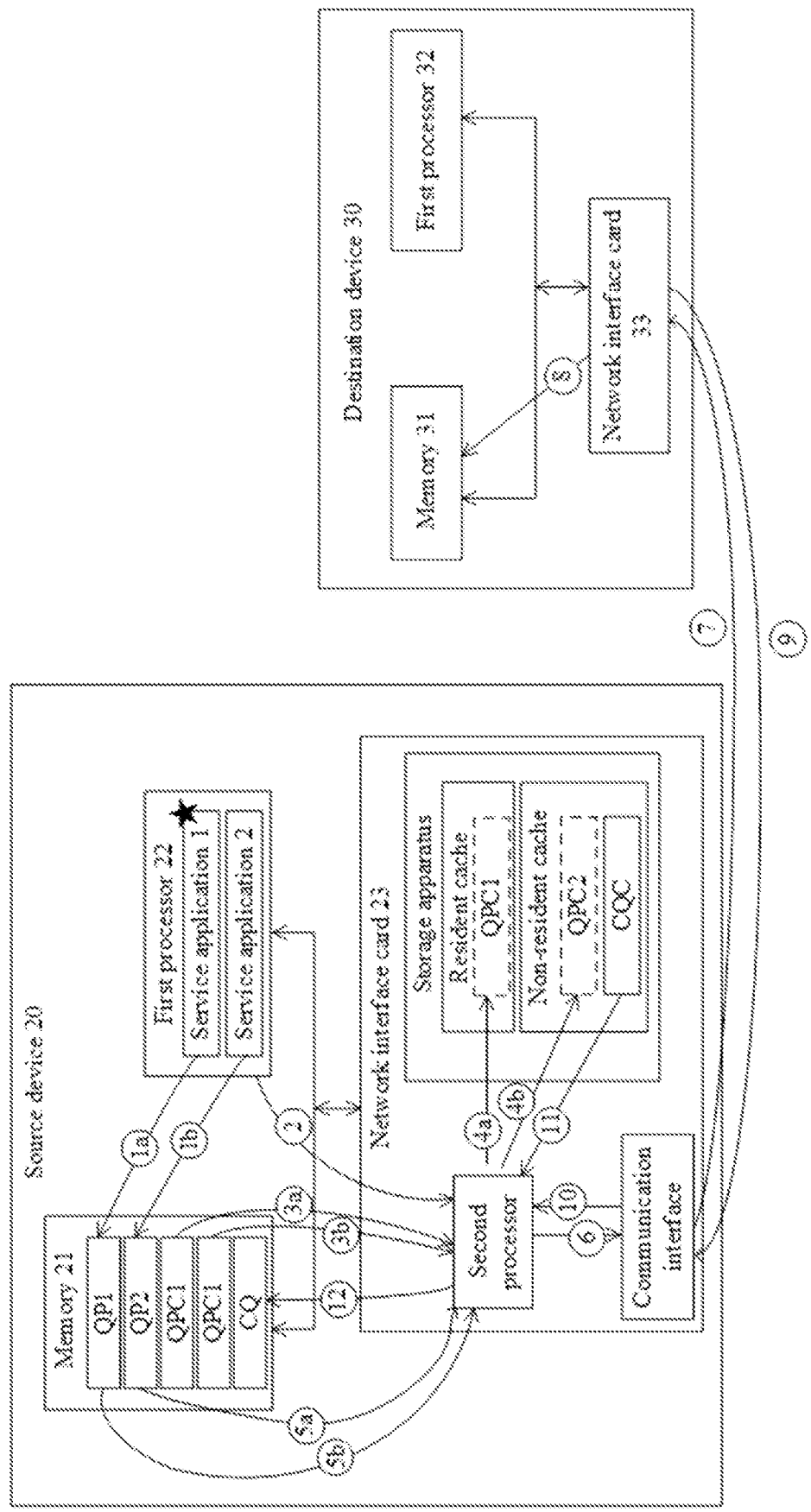
FIG. 9 is a diagram of a specific example of a data processing method according to this application.

The following further describes the data processing method provided in this application with reference to a specific example. As shown in FIG. 9, a service application 1 and a service application 2 simultaneously run on a first processor 22 of a source device 20, where a service level of the service application 1 is higher than a service level of the service application 2. For example, the source device 20 reads data from a destination device. Specific steps are as follows.

Step 1: A service program 1 generates an RDMA read request 1 and stores the RDMA read request 1 in an SQ1, and the service program 2 generates an RDMA read request 2 and stores the RDMA read request 2 in an SQ2.

Step 2: The first processor notifies a network interface card that there are to-be-processed work requests in the SQ1 and SQ2.

Step 3a: A second processor on the network interface card of the source device determines, according to service levels of the service applications, to first execute the work request in the SQ1, and retrieves a QPC1 of the SQ1 in a storage apparatus. After the retrieval fails, the second processor obtains the QPC1 from the memory.

Step 4a: The second processor marks a storage type of the QPC1 as resident storage according to the service level of the service application 1, and stores the QPC1 in a resident cache.

Step 5a: The second processor obtains the RDMA read request 1 of the service application 1 according to a QP address and a QP address index in the QPC1.

Step 6: The second processor sends the service level of the service application 1 and the RDMA read request 1 to a communication interface.

Step 7: The communication interface sends the service level of the service application 1 and the RDMA read request 1 to a network interface card 33 of the destination device 30.

Step 8: The network interface card 33 of the destination device reads data from a memory according to the RDMA read request 1.

Step 9: The network interface card 33 of the destination device returns data obtained through reading to the communication interface.

Step 10: The communication interface sends the data obtained through reading to the second processor.

Step 11: The second processor retrieves a CQC of a CQ in a storage apparatus. After the retrieval succeeds, the second processor obtains the CQC from the storage apparatus.

Step 12: The second processor places a generated CQE into the CQ according to the CQC.

When the foregoing steps are performed, the source device completes processing of the RDMA write request 1 of the service application 1, and then the network interface card of the source device processes the RDMA write request 2 of the service application 2.

Step 3b: The network interface card of the source device retrieves a QPC2 of the SQ2 in the storage apparatus. After the retrieval fails, the second processor obtains the QPC2 from the memory.

Step 4b: The second processor marks a storage type of the QPC2 as non-resident storage according to the service level of the service application 2, and stores the QPC2 in a non-resident cache.

Step 5b: The second processor obtains the RDMA read request 2 of the service application 2 according to an SQ address and an SQ address index in the QPC2.

Subsequent steps performed by the network interface card to process the RDMA read request 2 is similar to steps 4 to 12.

It can be learned from the foregoing steps that, according to the data processing method provided in this application, a work request of a service application at a high service level can be preferentially processed, and when storage resources in a network interface card are limited, cache space required by the service application at the high service level is preferentially ensured. This ensures transmission efficiency of an important service application.

Figure 10:
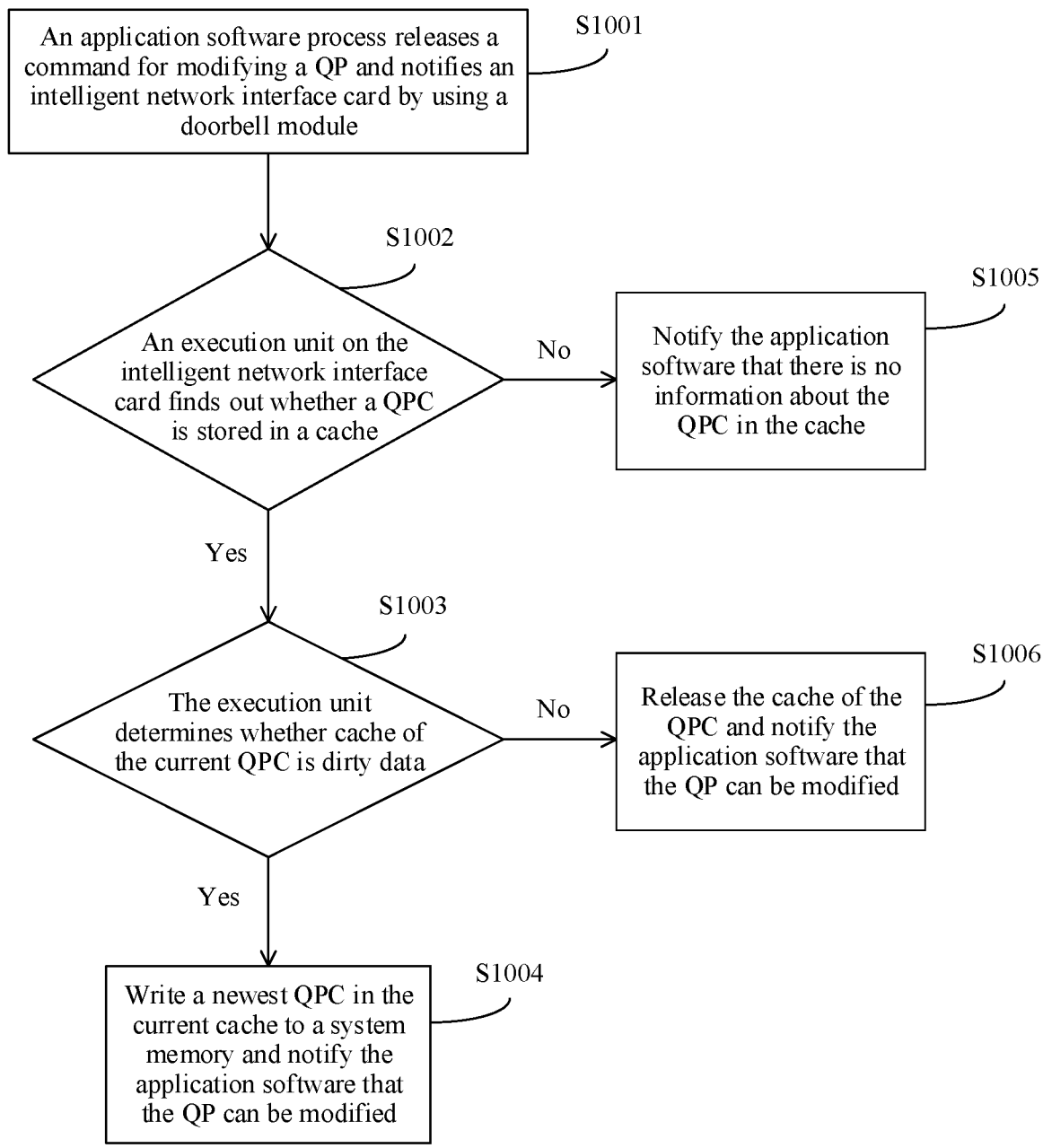
FIG. 10 is a schematic flowchart of a method for modifying a QPC by using application software according to an embodiment of this application.

FIG. 10 is a schematic flowchart of a method for modifying a QPC by using application software according to this embodiment. Specifically, the method includes the following steps.

S1001. An application software process releases a command for modifying a QP and notifies an intelligent network interface card by using a doorbell module.

S1002. An execution unit on the intelligent network interface card finds out whether a QPC is stored in a cache. If yes, the execution unit performs step S1003; otherwise, the execution unit performs step 1005 to notify the application software that there is no information about the QPC in the cache and the QP can be modified.

S1003. The execution unit determines whether cache of the current QPC is dirty data. If yes, the execution unit executes step 1004 to write a newest QPC in the current cache to a system memory, and notifies the application software that the QP can be modified. If no, the execution unit executes step S1006 to release cache of the QPC, and notifies the application software that the QP can be modified.

Figure 11:
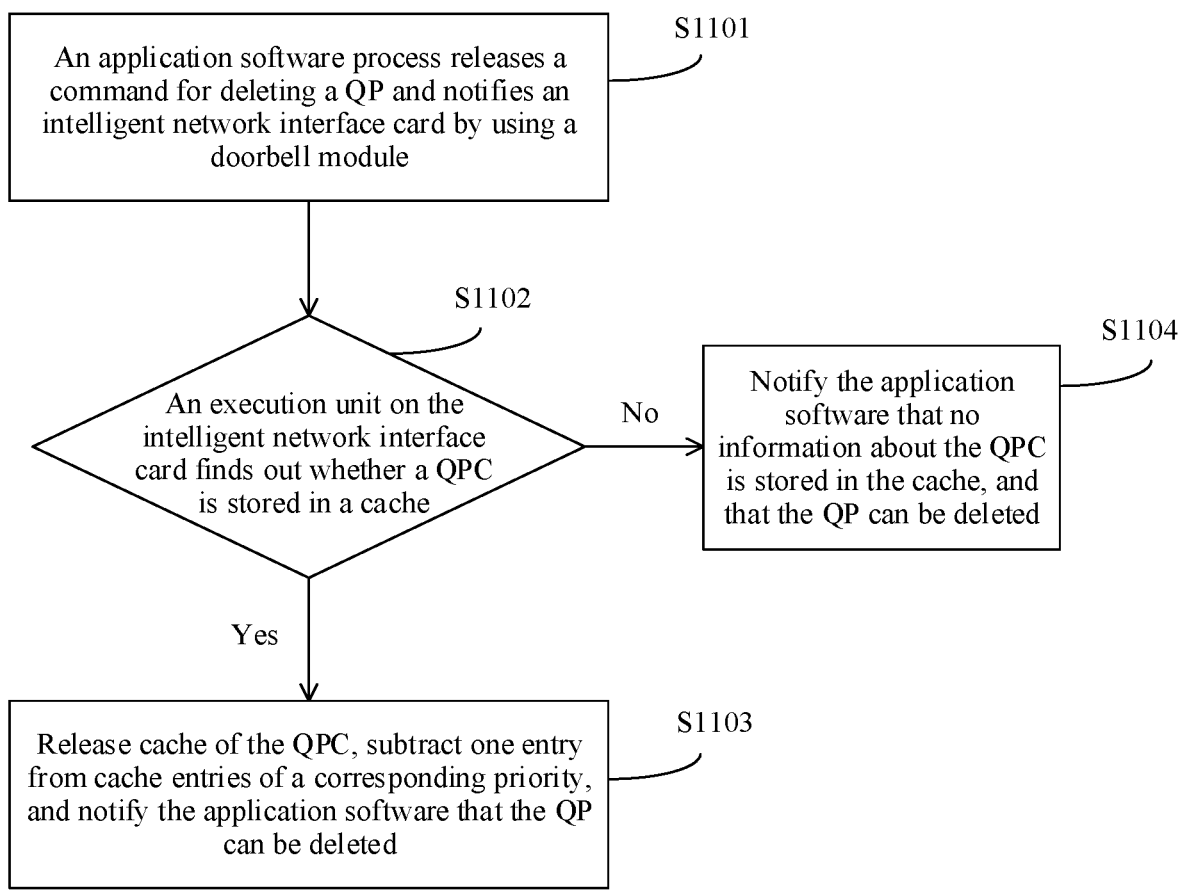
FIG. 11 is a schematic flowchart of a method for deleting a QPC by using application software according to an embodiment of this application.

FIG. 11 is a schematic flowchart of a method for deleting a QPC by using application software according to this embodiment. Specifically, the method includes the following steps.

S1101. An application software process releases a command for deleting a QP and notifies a network interface card by using a doorbell module.

S1102. An execution unit on the network interface card finds out whether a QPC is stored in a cache. If the QPC exists, the execution unit performs step S1103, that is, releases a cache of the QPC, subtracts one entry from cache entries of a corresponding priority, and notifies the application software that the QP can be deleted. Otherwise, the execution unit performs step 114 to notify the application software that information about the QPC does not exist in the cache and the QP can be deleted.

It can be learned from the descriptions of the foregoing process that the data processing method provided in embodiments of this application may provide a flexible interface for application software, so that a user can manage a network connection through a network management plane to create, delete, query, and modify a QP, and perform Qos configuration based on an actual communication requirement.

It should be noted that, for brief description, the foregoing method embodiments are represented by a series of actions. However, a person skilled in the art should be aware that this application is not limited by the described order of the actions. In addition, a person skilled in the art should also be aware that embodiments described in this specification are example embodiments, and the involved actions are not necessarily required by this application.

Another proper combination of steps figured out by a person skilled in the art based on the foregoing descriptions also falls within the protection scope of this application. In addition, a person skilled in the art should also understand that embodiments described in this specification are example embodiments, and the involved actions are not necessarily required by this application.

The foregoing describes in detail the data transmission method provided in embodiments of this application with reference to FIG. 6 to FIG. 11. The following describes a data transmission apparatus and a device provided in embodiments of this application with reference to FIG. 12 and FIG. 13.

Figure 12:
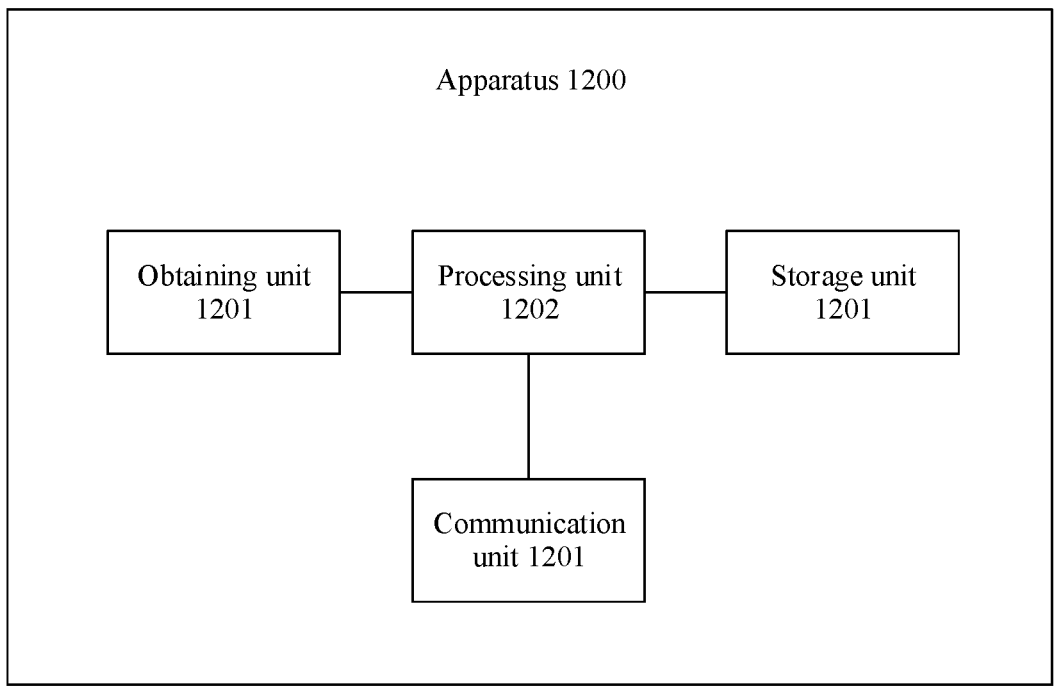
FIG. 12 is a schematic diagram of a data transmission apparatus according to an embodiment of this application.

FIG. 12 is a schematic diagram of a data transmission apparatus 1200 according to this application. The apparatus includes an obtaining unit 1201, a processing unit 1202, and a communication unit 1203.

The obtaining unit 1201 is configured to obtain a first notification message and a second notification message, where the first notification message indicates that a first to-be-processed remote direct memory access RDMA request exists in a first queue of a source device, the first queue is used to store a RDMA request of a first service application in the source device, the second notification message indicates that a second to-be-processed remote direct memory access RDMA request exists in a second queue of the source device, and the second queue is used to store an RDMA request of a second service application in the source device.

The processing unit 1202 is configured to determine a processing sequence of the first queue and the second queue according to a service level of the first service application and a service level of the second service application.

The communication unit 1203 is configured to send the first to-be-processed RDMA request and the second to-be-processed RDMA request to a destination device according to the processing sequence.

It should be understood that the data transmission apparatus 1200 in this embodiment of this application may be implemented by a general-purpose processor (CPU) or an application-specific integrated circuit (ASIC), or may be implemented by a programmable logic device (PLD). The PLD may be a complex programmable logic device (CPLD), a field-programmable gate array (FPGA), generic array logic (GAL), or any combination thereof. Alternatively, when the sensing methods shown in FIG. 6 to FIG. 11 are implemented by using software, the data transmission apparatus 1200 and modules thereof may be software modules.

Optionally, the processing unit 1202 may be further configured to: when processing of the first service application is arranged before processing of the second service application, obtain the first to-be-processed RDMA request, and send the first to-be-processed RDMA request to the destination device by using the communication unit 1203. Then the processing unit obtains the second to-be-processed request, and sends the second to-be-processed RDMA request to the destination device by using the communication unit 1203.

Optionally, the apparatus 1200 further includes a storage unit 1204. Before the network interface card sends the to-be-processed RDMA request in the first queue to the destination device, the processing unit 1202 is further configured to determine, according to a specified rule, a storage manner in which a context of the first queue is stored in the storage apparatus. The context of the first queue indicates an identifier of the destination device and an identifier of a queue associated with the first queue in the destination device. After the obtaining unit 1201 obtains the context of the first queue, the processing unit 1202 stores the context of the first queue in the storage unit 1204 of the network interface card in accordance with the storage manner.

Optionally, the processing unit 1202 is further configured to determine, based on an operation type of the to-be-processed RDMA request in the first queue, the storage manner in which the context of the first queue is stored in the storage apparatus, where the operation type includes a persistent collective operation.

Optionally, the processing unit 1202 is further configured to: compare a size of a data packet in the to-be-processed RDMA request in the first queue with a first threshold; and determine, based on a comparison result, the storage manner in which the context of the first queue is stored in the storage apparatus.

Optionally, the processing unit 1202 is further configured to: compare a usage frequency of the first queue with a second threshold, where the first queue includes a plurality of work queue elements WQEs, each WQE is used to store one to-be-processed RDMA request, and the usage frequency is used to identify a quantity of to-be-processed RDMA requests stored within a first time threshold in the elements of the first queue.

Optionally, the processing unit 1202 is further configured to determine, based on the service level of the first service application, the storage manner in which the context of the first queue is stored in the storage apparatus.

Optionally, the first queue and the context of the first queue are stored in the memory of the source device. That after the obtaining unit 1201 obtains the context of the first queue from the memory, the processing unit 1202 is further configured to store the context of the first queue in the storage unit 1204 in accordance with the storage manner includes: The processing unit 1202 stores the context of the first queue in a first region of the storage unit 1204, and retain the context of the first queue in the first storage region within the first time threshold.

Optionally, the second queue and a context of the second queue are stored in the memory of the source device. That after the obtaining unit 1201 obtains the context of the second queue from the memory, the processing unit 1202 is further configured to store the context of the second queue in the storage unit 1204 in accordance with the storage manner includes: The processing unit 1202 stores the context of the second queue in a second storage region of the storage unit 1204, and deletes the context of the second queue from the second storage region after sending of the second to-be-processed RDMA request is completed.

Optionally, the processing unit 1202 is further configured to obtain the context of the first queue or the context of the second queue from the memory of the source device through direct memory access DMA.

Optionally, when remaining space of the first storage region is less than a preset threshold, the processing unit 1202 is further configured to use a storage region of a size of a third threshold in the second storage region as an added storage region of the first storage region.

Optionally, when remaining space of the first storage region is less than a preset threshold, the processing unit 1202 is further configured to store a context of a third queue in the second storage region, where the context of the third queue is retained in the second storage region within the first time threshold, the context of the third queue indicates the identifier of the destination device and an identifier of a queue associated with the third queue in the destination device, and the third queue is used to store a to-be-processed RDMA request of a third service application.

Optionally, when remaining space of the second storage region is less than a preset threshold, the processing unit 1202 is further configured to: store the context of the second queue in the second storage region of the storage apparatus of the network interface card, and delete a context of a fourth queue from the second storage region, where the context of the fourth queue indicates the identifier of the destination device and an identifier of a queue associated with the fourth queue in the destination device, and the fourth queue is used to store a to-be-processed RDMA request of a fourth service application.

Optionally, when remaining space of the second storage region is less than a preset threshold, the processing unit 1202 is further configured to: store the context of the second queue in the second storage region of the storage apparatus of the network interface card, and delete a context of a fifth queue from the second storage region, where the context of the fifth queue indicates the identifier of the destination device and an identifier of a queue associated with the fifth queue in the destination device, the fifth queue is used to store a to-be-processed RDMA request of a fifth service application, and a storage level of the context of the fifth queue is lower than that of the context of the second queue.

Optionally, when remaining space of the second storage region is less than a preset threshold, the processing unit 1202 stores the context of the second queue in the second storage region of the storage apparatus of the network interface card, and deletes a context of a sixth queue from the second storage region, where the context of the sixth queue indicates the identifier of the destination device and an identifier of a queue associated with the sixth queue in the destination device, the sixth queue is used to store a to-be-processed RDMA request of a sixth service application, and a storage level of the context of the sixth queue is the lowest among storage levels of contexts of all queues in the second storage region.

Optionally, the processing unit 1202 is further configured to determine whether a deleted context is dirty data. If yes, the processing unit 1202 stores the deleted context in a context cache region of a corresponding queue in the memory. If no, the processing unit 1202 directly deletes the deleted context. According to the foregoing method, the network interface card can instantly synchronize a queue context in the memory and a queue context in the storage apparatus.

Optionally, the obtaining unit 1201 is further configured to obtain the first to-be-processed RDMA request from the memory of the source device, and the processing unit 1202 stores the first to-be-processed RDMA request in the storage unit 1204. Then the communication unit 1203 is further configured to send the first to-be-processed RDMA request to the destination device. That after sending the first to-be-processed request to the destination device, the obtaining unit 1202 obtains the second to-be-processed request, and sends the second to-be-processed RDMA request to the destination device by using the communication unit 1203 includes: The obtaining unit 1201 obtains the second to-be-processed RDMA request from the memory of the source device, the processing unit 1202 stores the second to-be-processed RDMA request in the storage unit 1204, and the communication unit 1203 sends the second to-be-processed RDMA request to the destination device.

The data transmission apparatus 1200 in this embodiment of this application may correspondingly perform the method described in embodiments of this application. In addition, the foregoing and other operations and/or functions of the units in the data transmission apparatus 1200 are used to implement corresponding procedures of the methods in FIG. 6 to FIG. 11. For brevity, details are not described herein again.

In conclusion, according to the data transmission apparatus 1200 provided in this embodiment of this application, the apparatus 1200 may percept a service level of a service application, determine a processing sequence of a queue based on the service level corresponding to the service, and then perform data transmission of a to-be-processed RDMA request according to the processing sequence. In this way, it is ensured that a service application at a specified service level can be preferentially sent to a destination device, thereby reducing a latency in data transmission of the service application.

Figure 13:
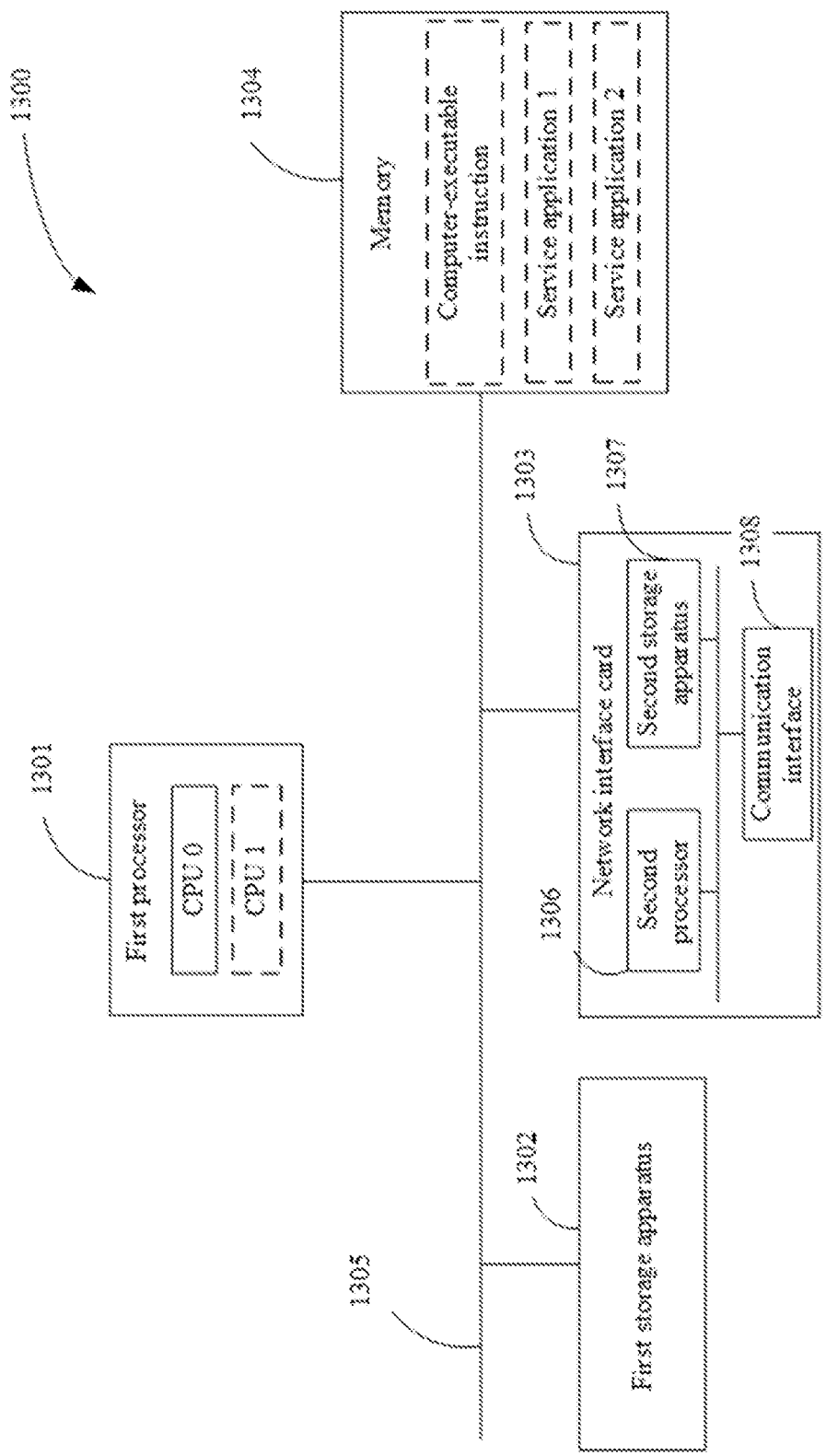
FIG. 13 is a schematic diagram of a device according to an embodiment of this application.

FIG. 13 is a schematic diagram of a device 1300 according to an embodiment of this application. As shown in the figure, the device 1300 includes a first processor 1301, a first storage apparatus 1302, a network interface card 1303, a bus 1305, and a memory 1304. Communication between the first processor 1301, the first storage apparatus 1302, the network interface card 1303, and the memory 1304 is achieved by using the bus 1305, or in other manners such as wireless transmission. The first processor 1301 is configured to run a plurality of service applications, where each service application is associated with one queue. The memory is configured to store to-be-processed remote direct memory access RDMA requests in queues associated with the plurality of service applications and contexts of the queues associated with the plurality of service applications.

The network interface card 1303 includes a second processor 1306, a second storage apparatus 1307, and a communication interface 1308. The second processor 1306 is configured to execute a computer-executable instruction stored in the second storage apparatus, to implement the following operation steps:
  obtaining a first notification message, where the first notification message indicates that a first to-be-processed remote direct memory access RDMA request exists in a first queue of a source device, and the first queue is used to store an RDMA request of a first service application of the source device;
  obtaining a second notification message, where the second notification message indicates that a second to-be-processed remote direct memory access RDMA request exists in a second queue of the source device, and the second queue is used to store an RDMA request of a second service application of the source device;
  determining a processing sequence of the first queue and the second queue according to a service level of the first service application and a service level of the second service application; and
  sending the first to-be-processed RDMA request and the second to-be-processed RDMA request to a destination device according to the processing sequence.

It should be understood that the first processor 1301 or the second processor 1306 in this embodiment of this application may be a CPU, or may be another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor, or may be any conventional processor or the like.

The first storage apparatus 1302 or the second storage apparatus 1307 may include a read-only memory and a random access memory, and provides instructions and data to the processor 701. The first storage apparatus 1302 or the second storage apparatus 1307 may further include a non-volatile random access memory. For example, the first storage apparatus 1302 or the second storage apparatus 1307 may further store device type information.

The first storage apparatus 1302 or the second storage apparatus 1307 may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through example but not limitative description, RAMs in a plurality of forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 1305 may further include a power bus, a control bus, a status signal bus, and the like. However, for clarity of description, various buses are collectively marked as the bus 1305 in the figure.

It should be understood that the device 1300 according to this embodiment of this application may correspond to the data transmission apparatus 1200 in the embodiment of this application, and may correspond to the source device in the methods shown in FIG. 6 to FIG. 11 in embodiments of this application. Alternatively, the device may be any device in the system shown in FIG. 1. The foregoing and other operations and/or functions of the modules in the device 1300 are used to implement corresponding processes of the methods in the figures. For brevity, details are not described herein again.

It can be learned from the foregoing descriptions that the device 1300 provided in this embodiment of this application can perceive service levels of service applications, determine a processing sequence of a plurality of queues based on service levels of different service applications, and perform data transmission of to-be-processed RDMA requests of different queues according to the processing sequence. As a result, the network interface card can perceive a service level of a service application, and send to-be-processed RDMA requests of service applications at different service levels based on the service levels. In this way, a to-be-processed RDMA request of a specified service application can be preferentially and quickly sent to the destination device, thereby reducing a processing latency of a service application at a specified service level.

This application further provides a chip. The chip includes a processor and a communication interface. The communication interface is configured to communicate with a processor of a device in which the chip is located. The processor may be an implementation form of the second processor 1306 in the network interface card 1302 shown in FIG. 13. The processor of the chip is configured to implement functions of the steps of the methods performed by the network interface card of the source device in the methods shown in FIG. 6 to FIG. 11. For brevity, details are not described herein again.

Optionally, the chip may be a chip that implements functions of the network interface card in FIG. 6 to FIG. 11, or may be the network interface card 1303 shown in FIG. 13, or may be an offload card other than the network interface card 1303 in the device 1300 shown in FIG. 13. The offload card is configured to determine a processing sequence of different queues based on service levels of service applications, and then send a to-be-processed RDMA request based on the determined processing sequence. For brevity, details are not described herein again.

This application further provides a network interface card. A structure of the network interface card is the structure of the network interface card 1303 shown in FIG. 13. The network interface card is configured to implement functions of the steps of the methods performed by the network interface card of the source device in the methods described in FIG. 6 to FIG. 11. For brevity, details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded or executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (DSL)) or a wireless manner (for example, infrared, radio, and microwave). The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium, or the like. The semiconductor medium may be a solid state drive (SSD).

The foregoing descriptions are merely specific implementations of this application. Any variation or replacement figured out by a person skilled in the art based on the specific implementations provided in this application shall fall within the protection scope of this application.

What is claimed is:

1. A data transmission method comprising:
   obtaining, by a network interface card of a source device, a first notification message, wherein the first notification message indicates that a first to-be-processed remote direct memory access (RDMA) request exists in a first queue of the source device, and the first queue is used to store a request of a first service application of the source device;
   obtaining, by the network interface card, a second notification message, wherein the second notification message indicates that a second to-be-processed RDMA request exists in a second queue of the source device, and the second queue is used to store a request of a second service application of the source device;
   determining, by the network interface card, a processing sequence of the first queue and the second queue according to a service level of the first service application and a service level of the second service application;
   determining, by the network interface card according to a specified rule, a storage manner in which a context of the first queue is stored in a storage apparatus of the network interface card, wherein the context of the first queue indicates an identifier of the destination device and an identifier of a queue associated with the first queue in the destination device;
   obtaining, by the network interface card, the context of the first queue; and
   storing, by the network interface card, the context of the first queue in the storage apparatus of the network interface card in accordance with the storage manner; and
   sending, by the network interface card, the first to-be-processed RDMA request and the second to-be-processed RDMA request to a destination device according to the processing sequence, wherein the determining, by the network interface card according to the specified rule, the storage manner in which the context of the first queue is stored in the storage apparatus comprises one of:
   (1) determining, by the network interface card based on an operation type of the to-be-processed RDMA request in the first queue, the storage manner in which the context of the first queue is stored in the storage apparatus, wherein the operation type comprises a persistent collective operation;
   (2) comparing, by the network interface card, a size of a data packet in the to-be-processed RDMA request in the first queue with a first threshold; and
   determining, by the network interface card based on a comparison result, the storage manner in which the context of the first queue is stored in the storage apparatus; and
   (3) comparing, by the network interface card, a usage frequency of the first queue with a second threshold, wherein the first queue comprises a plurality of work queue elements (WQEs), each WQE is used to store one to-be-processed RDMA request, and the usage frequency is used to identify a quantity of to-be-processed RDMA requests stored within a first time threshold in the elements of the first queue; and
   determining, by the network interface card based on a comparison result, the storage manner in which the context of the first queue is stored in the storage apparatus.

2. The method according to claim 1, wherein the sending the first to-be-processed RDMA request and the second to-be-processed RDMA request to the destination device according to the processing sequence comprises:
   based on processing of the first service application being arranged before processing of the second service application, obtaining, by the network interface card, the first to-be-processed RDMA request, and sending the first to-be-processed RDMA request to the destination device; and
   after sending the first to-be-processed request to the destination device, obtaining, by the network interface card, the second to-be-processed request, and sending the second to-be-processed request to the destination device.

3. The method according to claim 1, wherein the determining, by the network interface card according to the specified rule, the storage manner in which the context of the first queue is stored in the storage apparatus comprises:
  determining, by the network interface card based on the service level of the first service application, the storage manner in which the context of the first queue is stored in the storage apparatus.

4. The method according to claim 1, wherein the first queue and the context of the first queue are stored in a memory of the source device, the obtaining, by the network interface card, the context of the first queue comprises:
  obtaining, by the network interface card, the context of the first queue from the memory of the source device; and
  wherein the storing, by the network interface card, the context of the first queue in the storage apparatus of the network interface card in accordance with the storage manner comprises:
  storing, by the network interface card, the context of the first queue in a first storage region of the storage apparatus of the network interface card, and retaining the context of the first queue in the first storage region within the first time threshold.

5. The method according to claim 2, wherein the second queue and a context of the second queue are stored in the memory of the source device, and before the network interface card obtains the second to-be-processed RDMA request, the method further comprises:
  obtaining, by the network interface card, the context of the second queue from the memory of the source device; and
  storing, by the network interface card, the context of the second queue in a second storage region of the storage apparatus of the network interface card, and deleting the context of the second queue from the second storage region after sending of the second to-be-processed RDMA request is completed.

6. The method according to claim 1, wherein the obtaining, by the network interface card, the context of the first queue from the memory of the source device comprises:
  obtaining, by the network interface card, the context of the first queue or the context of the second queue from the memory of the source device through direct memory access (DMA).

7. The method according to claim 1, further comprising:
  based on remaining space of the first storage region being less than a third threshold, using, by the network interface card, a storage region of a size of a fourth threshold in the second storage region as an added storage region of the first storage region.

8. The method according to claim 4, further comprising:
  based on remaining space of the first storage region being less than a third threshold, storing, by the network interface card, a context of a third queue in the second storage region, wherein the context of the third queue is retained in the second storage region within the first time threshold, the context of the third queue indicates the identifier of the destination device and an identifier of a queue associated with the third queue in the destination device, and the third queue is used to store a to-be-processed RDMA request of a third service application.

9. The method according to claim 2, wherein the obtaining, by the network interface card, the first to-be-processed RDMA request, and sending the first to-be-processed RDMA request to the destination device comprises:
  obtaining, by the network interface card, the first to-be-processed RDMA request from the memory of the source device, and storing the first to-be-processed RDMA request in the storage apparatus of the network interface card; and
  sending, by the network interface card, the first to-be-processed RDMA request to the destination device; and
  wherein after sending the first to-be-processed request to the destination device, the obtaining, by the network interface card, the second to-be-processed request, and the sending the second to-be-processed request to the destination device comprises:
  obtaining, by the network interface card, the second to-be-processed RDMA request from the memory of the source device, and storing the second to-be-processed RDMA request in the storage apparatus of the network interface card; and
  sending, by the network interface card, the second to-be-processed RDMA request to the destination device.

10. The method according to claim 1, wherein the network interface card obtains the first to-be-processed RDMA request or the second to-be-processed RDMA request from the memory of the source device through direct memory access (DMA).

11. A chip comprising: a processor and a communication interface, wherein the communication interface is configured to communicate with a processor of a source device in which the chip is located, and the processor of the chip is configured to implement:
  obtain a first notification message, wherein the first notification message indicates that a first to-be-processed remote direct memory access (RDMA) request exists in a first queue of the source device, and the first queue is used to store a request of a first service application of the source device;
  obtain a second notification message, wherein the second notification message indicates that a second to-be-processed RDMA request exists in a second queue of the source device, and the second queue is used to store a request of a second service application of the source device;
  determine a processing sequence of the first queue and the second queue according to a service level of the first service application and a service level of the second service application;
  determine, according to a specified rule, a storage manner in which a context of the first queue is stored in a storage apparatus, wherein the context of the first queue indicates an identifier of the destination device and an identifier of a queue associated with the first queue in the destination device;
  obtain the context of the first queue; and
  store, the context of the first queue in the storage apparatus of the network interface card in accordance with the storage manner; and
  send the first to-be-processed RDMA request and the second to-be-processed RDMA request to a destination device according to the processing sequence, wherein the processor of the chip is configured to implement one of:
  (1) determine, based on an operation type of the to-be-processed RDMA request in the first queue, the storage manner in which the context of the first queue is stored in the storage apparatus, wherein the operation type comprises a persistent collective operation; and
  (2) compare a size of a data packet in the to-be-processed RDMA request in the first queue with a first threshold; and determine, based on a comparison result, the storage manner in which the context of the first queue is stored in the storage apparatus.

12. The chip according to claim 11, wherein the processor of the chip is configured to implement:
based on processing of the first service application being arranged before processing of the second service application, obtain the first to-be-processed RDMA request, and send the first to-be-processed RDMA request to the destination device; and
after sending the first to-be-processed request to the destination device, obtain the second to-be-processed request, and send the second to-be-processed request to the destination device.

13. A device comprising: a first processor, a memory, and a network interface card,
wherein the first processor is configured to run a plurality of service applications, each service application is associated with one queue, the memory is configured to store to-be-processed remote direct memory access (RDMA) requests in queues associated with the plurality of service applications, and the network interface card is configured to implement:
obtain a first notification message, wherein the first notification message indicates that a first to-be-processed RDMA request exists in a first queue of the device, and the first queue is used to store a request of a first service application of the device;
obtain a second notification message, wherein the second notification message indicates that a second to-be-processed RDMA request exists in a second queue of the device, and the second queue is used to store a request of a second service application of the device;
determine a processing sequence of the first queue and the second queue according to a service level of the first service application and a service level of the second service application;
determine, according to a specified rule, a storage manner in which a context of the first queue is stored in a storage apparatus, wherein the context of the first queue indicates an identifier of the destination device and an identifier of a queue associated with the first queue in the destination device;
obtain the context of the first queue; and
store, the context of the first queue in the storage apparatus of the network interface card in accordance with the storage manner; and
send the first to-be-processed RDMA request and the second to-be-processed RDMA request to a destination device according to the processing sequence, wherein the network interface card is configured to implement one of:
(1) determine, based on an operation type of the to-be-processed RDMA request in the first queue, the storage manner in which the context of the first queue is stored in the storage apparatus, wherein the operation type comprises a persistent collective operation; and
(2) compare a size of a data packet in the to-be-processed RDMA request in the first queue with a first threshold; and
determine, based on a comparison result, the storage manner in which the context of the first queue is stored in the storage apparatus.

* * * * *